(12) United States Patent
Mital et al.

(10) Patent No.: US 10,031,724 B2
(45) Date of Patent: Jul. 24, 2018

(54) APPLICATION OPERATION RESPONSIVE TO OBJECT SPATIAL STATUS

(71) Applicant: Microsoft Technology Licensing, LLC, Redmond, WA (US)

(72) Inventors: Vijay Mital, Kirkland, WA (US); Nizam Anuar, Snoqualmie, WA (US); Suraj T. Poozhiyil, Redmond, WA (US); Henry Hun-Li Reid Pan, Sammamish, WA (US); Bao Quoc Nguyen, Bellevue, WA (US); Andrew Reddish, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 397 days.

(21) Appl. No.: 14/794,751

(22) Filed: Jul. 8, 2015

(65) Prior Publication Data

US 2017/0010590 A1 Jan. 12, 2017

(51) Int. Cl.
*G06F 9/44* (2018.01)
*G06F 9/45* (2006.01)
(Continued)

(52) U.S. Cl.
CPC ............ *G06F 8/20* (2013.01); *G05B 13/0205* (2013.01); *G06F 8/35* (2013.01); *G06F 8/36* (2013.01);
(Continued)

(58) Field of Classification Search
None
See application file for complete search history.

(56) References Cited

U.S. PATENT DOCUMENTS 5,596,702 A 1/1997 Stucka et al.
5,632,034 A 5/1997 O'Farrell
(Continued)

FOREIGN PATENT DOCUMENTS

DE 102012110802 11/2013
EP 0475581 3/1992
(Continued)

OTHER PUBLICATIONS

Lemmens et al., "Integrating Semantic and Syntactic Descriptions to Chain Geographic Services", Sep.-Oct. 2006, IEEE Computer Society, pp. 42-52.*
(Continued)

*Primary Examiner* — Qing Yuan Wu
(74) *Attorney, Agent, or Firm* — Workman Nydegger

(57) ABSTRACT

Operating an application in response to spatial status of objects within a physical environment in which the application operates. A system detects the spatial status (e.g., orientation, movement, position, and so forth) of multiple environmental objects that operate within a physical environment from which input is provided to, and to which output is provided from, an application. The relationship between at least some different environmental objects result in altered a behavior of the application. The spatial status of at least some of the environmental objects is subject to change. Thus, a mechanism is described that allows an application to adjust in a manner that is highly responsive to the physical environment in which the application interfaces.

20 Claims, 23 Drawing Sheets

(51) Int. Cl.
*G06Q 10/06* (2012.01)
*G05B 13/02* (2006.01)
*G06F 8/20* (2018.01)
*G06F 8/36* (2018.01)
*G06F 8/35* (2018.01)
*G06F 9/448* (2018.01)
*G06F 8/41* (2018.01)

(52) U.S. Cl.
CPC .......... *G06F 9/4494* (2018.02); *G06Q 10/06* (2013.01); *G06F 8/48* (2013.01)

(56) References Cited

U.S. PATENT DOCUMENTS

| | | |
|---|---|---|
| 5,717,939 A | 2/1998 | Bricklin et al. |
| 5,884,083 A | 3/1999 | Royce |
| 6,005,548 A | 12/1999 | Latypov et al. |
| 6,009,410 A | 12/1999 | LeMole et al. |
| 6,061,644 A | 5/2000 | Leis |
| 6,351,843 B1 | 2/2002 | Berkley et al. |
| 6,442,476 B1 | 8/2002 | Poropat |
| 6,536,037 B1 | 3/2003 | Guheen et al. |
| 6,662,199 B1 | 12/2003 | Flight et al. |
| 6,708,329 B1 | 3/2004 | Whitehill et al. |
| 6,820,135 B1 | 11/2004 | Dingman et al. |
| 6,917,963 B1 | 7/2005 | Hipp et al. |
| 6,950,850 B1 | 9/2005 | Leff et al. |
| 6,988,271 B2 | 1/2006 | Hunt |
| 6,993,751 B2 | 1/2006 | Bhansali |
| 7,047,518 B2 | 5/2006 | Little et al. |
| 7,082,576 B2 | 7/2006 | Shahine et al. |
| 7,171,655 B2 | 1/2007 | Gordon et al. |
| 7,251,778 B1 | 7/2007 | Hill et al. |
| 7,269,794 B2 | 9/2007 | Martinez et al. |
| 7,275,241 B2 | 9/2007 | Choi |
| 7,417,644 B2 | 8/2008 | Cooper et al. |
| 7,433,956 B2 | 10/2008 | Zhao et al. |
| 7,458,029 B2 | 11/2008 | Agrawala et al. |
| 7,506,324 B2 | 3/2009 | Thiagarajan et al. |
| 7,509,374 B2 | 3/2009 | Trinh et al. |
| 7,519,959 B1 | 4/2009 | Dmitriev |
| 7,536,635 B2 | 5/2009 | Racovolis et al. |
| 7,539,982 B2 | 5/2009 | Stuart |
| 7,543,269 B2 | 6/2009 | Krueger et al. |
| 7,552,428 B2 | 6/2009 | Stoodley et al. |
| 7,558,748 B2 | 7/2009 | Ehring et al. |
| 7,664,813 B2 | 2/2010 | Pettit et al. |
| 7,698,430 B2 | 4/2010 | Jackson |
| 7,702,729 B2 | 4/2010 | Johanson et al. |
| 7,721,223 B2 | 5/2010 | Ben-Shachar et al. |
| 7,730,446 B2 | 6/2010 | Anonsen |
| 7,765,470 B2 | 7/2010 | Epstein |
| 7,779,429 B2 | 8/2010 | Neil et al. |
| 7,814,171 B2 | 10/2010 | Blegen et al. |
| 7,818,729 B1 | 10/2010 | Plum et al. |
| 7,853,938 B2 | 12/2010 | Melhem et al. |
| 7,908,594 B2 | 3/2011 | Varanasi et al. |
| 7,917,534 B2 | 3/2011 | Demiroski et al. |
| 7,926,029 B1 | 4/2011 | Stoyen |
| 7,930,432 B2 | 4/2011 | Blaszczak |
| 7,937,685 B2 | 5/2011 | Weil et al. |
| 7,954,084 B2 | 5/2011 | Arcaro et al. |
| 7,984,426 B2 | 7/2011 | Loff |
| 7,991,916 B2 | 8/2011 | Meek et al. |
| 8,014,308 B2 | 9/2011 | Gates et al. |
| 8,019,770 B1 | 9/2011 | Hartsook et al. |
| 8,036,140 B2 | 10/2011 | Rao et al. |
| 8,042,094 B2 | 10/2011 | Napoli |
| 8,060,544 B2 | 11/2011 | Werner et al. |
| 8,060,553 B2 | 11/2011 | Mamou et al. |
| 8,060,857 B2 | 11/2011 | Biggerstaff |
| 8,079,023 B2 | 12/2011 | Chen |
| 8,082,517 B2 | 12/2011 | Ben-Shachar et al. |
| 8,085,281 B2 | 12/2011 | Hines et al. |
| 8,161,463 B2 | 4/2012 | Johnson et al. |
| 8,171,398 B2 | 5/2012 | Hosotsubo |
| 8,191,080 B2 | 5/2012 | Goring et al. |
| 8,209,674 B2 | 6/2012 | Meijer et al. |
| 8,214,768 B2 | 7/2012 | Boule et al. |
| 8,214,799 B2 | 7/2012 | Haselden |
| 8,233,887 B2 | 7/2012 | Whitney et al. |
| 8,253,649 B2 | 8/2012 | Imai et al. |
| 8,255,156 B2 | 8/2012 | Ravenscroft et al. |
| 8,255,889 B2 | 8/2012 | Stefansson et al. |
| 8,332,828 B2 | 12/2012 | Vargas |
| 8,365,156 B2 | 1/2013 | Sollich |
| 8,402,379 B2 | 3/2013 | Barak |
| 8,407,605 B2 | 3/2013 | Go et al. |
| 8,438,533 B2 | 5/2013 | Fritzsche et al. |
| 8,456,654 B2 | 6/2013 | Kelly et al. |
| 8,464,208 B2 | 6/2013 | Feigen |
| 8,464,337 B2 | 6/2013 | Mathew et al. |
| 8,479,202 B2 | 7/2013 | Hogan et al. |
| 8,489,474 B2 | 7/2013 | Crook et al. |
| 8,495,580 B2 | 7/2013 | Gowri |
| 8,505,002 B2 | 8/2013 | Yehia et al. |
| 8,516,454 B2 | 8/2013 | Mizrachi et al. |
| 8,527,970 B1 | 9/2013 | Luecke |
| 8,528,000 B2 | 9/2013 | Schumacher et al. |
| 8,531,451 B2 | 9/2013 | Mital et al. |
| 8,533,661 B2 | 9/2013 | Nucci et al. |
| 8,583,413 B2 | 11/2013 | Elaasar |
| 8,600,446 B2 | 12/2013 | Chiang et al. |
| 8,607,206 B2 | 12/2013 | Freeman et al. |
| 8,615,551 B2 | 12/2013 | Balandin et al. |
| 8,635,521 B2 | 1/2014 | Fleishman et al. |
| 8,635,537 B1 | 1/2014 | Kan et al. |
| 8,650,384 B2 | 2/2014 | Lee et al. |
| 8,654,952 B2 | 2/2014 | Wang et al. |
| 8,667,130 B2 | 3/2014 | Shuster |
| 8,669,939 B2 | 3/2014 | Underkoffler et al. |
| 8,689,191 B2 | 4/2014 | Dolby |
| 8,707,278 B2 | 4/2014 | Balakrishnan et al. |
| 8,707,287 B2 | 4/2014 | Gregersen et al. |
| 8,779,971 B2 | 7/2014 | Wellington |
| 8,786,517 B2 | 7/2014 | Lewin et al. |
| 8,812,601 B2 | 8/2014 | Hsieh et al. |
| 8,832,676 B2 | 9/2014 | Mahajan et al. |
| 8,850,045 B2 | 9/2014 | Berg et al. |
| 8,892,850 B2 | 11/2014 | Archer et al. |
| 8,914,733 B2 | 12/2014 | Chai et al. |
| 8,928,582 B2 | 1/2015 | Senanayake et al. |
| 8,954,229 B2 | 2/2015 | Park |
| 8,965,349 B2 | 2/2015 | Kieft et al. |
| 8,990,779 B2 | 3/2015 | Schalk |
| 9,003,010 B1 | 4/2015 | Saparoff |
| 9,003,298 B2 | 4/2015 | Hoke et al. |
| 9,015,659 B2 | 4/2015 | Gregersen |
| 9,032,377 B2 | 5/2015 | Mizrachi et al. |
| 9,396,698 B2 | 7/2016 | Mital et al. |
| 9,424,309 B2 | 8/2016 | Ramachandra et al. |
| 2002/0115476 A1 | 8/2002 | Padawar et al. |
| 2002/0165993 A1 | 11/2002 | Kramer |
| 2002/0169851 A1 | 11/2002 | Weathersby et al. |
| 2003/0229685 A1 | 12/2003 | Twidale et al. |
| 2004/0070608 A1 | 4/2004 | Saka |
| 2004/0078760 A1 | 4/2004 | Melhem et al. |
| 2004/0216096 A1 | 10/2004 | Messer et al. |
| 2005/0041784 A1 | 2/2005 | Timmins et al. |
| 2005/0132045 A1 | 6/2005 | Hornback et al. |
| 2005/0138151 A1 | 6/2005 | Lam et al. |
| 2005/0177676 A1 | 8/2005 | Karatal et al. |
| 2005/0251339 A1 | 11/2005 | Araki et al. |
| 2006/0031779 A1 | 2/2006 | Theurer et al. |
| 2006/0074730 A1 | 4/2006 | Shukla et al. |
| 2006/0089990 A1 | 4/2006 | Ng et al. |
| 2006/0095865 A1 | 5/2006 | Rostom |
| 2006/0239234 A1 | 10/2006 | Rao et al. |
| 2007/0011008 A1 | 1/2007 | Scarano et al. |
| 2007/0038929 A1 | 2/2007 | Miyazawa |
| 2007/0067440 A1 | 3/2007 | Bhogal et al. |
| 2007/0078953 A1 | 4/2007 | Chai et al. |
| 2007/0174291 A1 | 7/2007 | Cooper et al. |
| 2007/0180362 A1 | 8/2007 | Hunt et al. |

(56) References Cited

U.S. PATENT DOCUMENTS

| | | |
|---|---|---|
| 2007/0271332 A1 | 11/2007 | Joshi et al. |
| 2007/0288850 A1 | 12/2007 | Fletcher et al. |
| 2007/0294626 A1 | 12/2007 | Fletcher et al. |
| 2008/0072211 A1 | 3/2008 | Rothman et al. |
| 2009/0094544 A1 | 4/2009 | Savage |
| 2009/0100178 A1 | 4/2009 | Gonzales et al. |
| 2009/0267780 A1 | 10/2009 | Van Hoff |
| 2010/0058205 A1 | 3/2010 | Vakil et al. |
| 2010/0077319 A1 | 3/2010 | Xu et al. |
| 2010/0083212 A1 | 4/2010 | Fritzsche et al. |
| 2010/0088634 A1 | 4/2010 | Tsuruta et al. |
| 2010/0131868 A1 | 5/2010 | Chawla et al. |
| 2010/0246571 A1 | 9/2010 | Geppert et al. |
| 2010/0251031 A1 | 9/2010 | Nieh et al. |
| 2010/0306670 A1 | 12/2010 | Quinn et al. |
| 2010/0306738 A1 | 12/2010 | Verma et al. |
| 2010/0312817 A1 | 12/2010 | Steakley |
| 2011/0055309 A1 | 3/2011 | Gibor et al. |
| 2011/0078103 A1 | 3/2011 | Teng et al. |
| 2011/0078560 A1 | 3/2011 | Weeldreyer et al. |
| 2011/0099496 A1 | 4/2011 | Baek et al. |
| 2011/0119576 A1 | 5/2011 | Aumann |
| 2011/0119603 A1 | 5/2011 | Peltz et al. |
| 2011/0154209 A1 | 6/2011 | Fan et al. |
| 2011/0197124 A1 | 8/2011 | Garaventa |
| 2011/0202909 A1 | 8/2011 | Meijer et al. |
| 2011/0228922 A1 | 9/2011 | Dhara et al. |
| 2011/0265003 A1 | 10/2011 | Schubert et al. |
| 2011/0289455 A1 | 11/2011 | Reville et al. |
| 2012/0016678 A1 | 1/2012 | Gruber et al. |
| 2012/0030632 A1 | 2/2012 | McRae et al. |
| 2012/0081396 A1 | 4/2012 | Yusupov et al. |
| 2012/0110009 A1 | 5/2012 | Kraft et al. |
| 2012/0144288 A1 | 6/2012 | Caruso et al. |
| 2012/0159472 A1 | 6/2012 | Hong et al. |
| 2012/0185100 A1 | 7/2012 | Strohbach et al. |
| 2012/0197728 A1 | 8/2012 | Luna et al. |
| 2012/0204180 A1 | 8/2012 | Santoli et al. |
| 2013/0024812 A1 | 1/2013 | Reeves et al. |
| 2013/0047079 A1 | 2/2013 | Kroeger et al. |
| 2013/0055113 A1 | 2/2013 | Chazin et al. |
| 2013/0086499 A1 | 4/2013 | Dyor et al. |
| 2013/0097498 A1 | 4/2013 | Steinberg et al. |
| 2013/0111360 A1 | 5/2013 | Kodama et al. |
| 2013/0117715 A1 | 5/2013 | Williams et al. |
| 2013/0178970 A1 | 7/2013 | Cachapa |
| 2013/0212487 A1 | 8/2013 | Cote |
| 2013/0212504 A1 | 8/2013 | Zalewski et al. |
| 2013/0212703 A1 | 8/2013 | Ramesh et al. |
| 2013/0219263 A1 | 8/2013 | Abrahami |
| 2013/0219303 A1 | 8/2013 | Eriksson et al. |
| 2013/0282532 A1 | 10/2013 | Shihadah et al. |
| 2013/0290863 A1 | 10/2013 | Chen et al. |
| 2013/0297696 A1 | 11/2013 | Alexandrov et al. |
| 2013/0311327 A1 | 11/2013 | Tehrani et al. |
| 2014/0007103 A1 | 1/2014 | Nachum et al. |
| 2014/0089888 A1 | 3/2014 | Bhaskara et al. |
| 2014/0096110 A1 | 4/2014 | Charters et al. |
| 2014/0181800 A1 | 6/2014 | Johansson et al. |
| 2014/0201155 A1 | 7/2014 | Vijayan et al. |
| 2014/0215356 A1 | 7/2014 | Brander et al. |
| 2014/0218343 A1 | 8/2014 | Hicks et al. |
| 2014/0223281 A1 | 8/2014 | Bocanegra |
| 2014/0229858 A1 | 8/2014 | Bleker et al. |
| 2014/0245140 A1 | 8/2014 | Brown et al. |
| 2014/0250193 A1 | 9/2014 | Goncalves et al. |
| 2014/0280580 A1 | 9/2014 | Langlois et al. |
| 2014/0282106 A1 | 9/2014 | Smith et al. |
| 2014/0289640 A1 | 9/2014 | Poornachandran et al. |
| 2014/0304594 A1 | 10/2014 | Pittenger et al. |
| 2014/0304663 A1 | 10/2014 | Mishra |
| 2014/0304718 A1 | 10/2014 | Gambardella et al. |
| 2014/0306964 A1 | 10/2014 | Reddish et al. |
| 2014/0310619 A1 | 10/2014 | Fickenwirth et al. |
| 2014/0310697 A1 | 10/2014 | Reddish et al. |
| 2014/0351717 A1 | 11/2014 | Pryor et al. |
| 2014/0359478 A1 | 12/2014 | Thakur et al. |
| 2015/0036848 A1 | 2/2015 | Donaldson |
| 2015/0067536 A1 | 3/2015 | Leorin et al. |
| 2015/0070263 A1 | 3/2015 | Murillo et al. |
| 2015/0081684 A1 | 3/2015 | Lewis |
| 2015/0261543 A1 | 9/2015 | Lahteenmaki |
| 2015/0355782 A1 | 12/2015 | Zhang et al. |
| 2015/0363581 A1 | 12/2015 | Ranadive et al. |
| 2016/0094429 A1 | 3/2016 | Richards et al. |
| 2017/0003862 A1 | 1/2017 | Mital et al. |
| 2017/0003940 A1 | 1/2017 | Mital et al. |
| 2017/0003943 A1 | 1/2017 | Mital et al. |
| 2017/0003944 A1 | 1/2017 | Mital et al. |
| 2017/0004021 A1 | 1/2017 | Mital et al. |
| 2017/0004022 A1 | 1/2017 | Mital et al. |
| 2017/0004116 A1 | 1/2017 | Mital et al. |
| 2017/0005897 A1 | 1/2017 | Mital et al. |
| 2017/0005970 A1 | 1/2017 | Mital et al. |
| 2017/0010673 A1 | 1/2017 | Mital et al. |
| 2017/0010758 A1 | 1/2017 | Mital et al. |
| 2017/0010789 A1 | 1/2017 | Mital et al. |
| 2017/0011011 A1 | 1/2017 | Mital et al. |

FOREIGN PATENT DOCUMENTS

| | | |
|---|---|---|
| EP | 1677239 | 7/2006 |
| EP | 2592506 | 5/2013 |
| WO | WO 2004013784 | 2/2004 |
| WO | WO 2008135459 | 11/2008 |
| WO | 2013097896 | 7/2013 |
| WO | 2013182159 | 12/2013 |
| WO | 2014032089 A1 | 3/2014 |
| WO | 2014158128 A1 | 10/2014 |

OTHER PUBLICATIONS

Yue et al., "Semantics-based automatic composition of geospatial Web service chains", 2007, Elsevier, pp. 649-665.*

Begel, Andrew, "CrystalBoard: A Transparent Shared Whiteboard", Retrieved on: Jul. 9, 2015 Available at: http://research.microsoft.com/en-us/um/people/abegel/cs294/cs294-paper.html.

Begole, et al., "Flexible Collaboration Transparency: Supporting Worker Independence in Replicated Application-Sharing Systems", In Journal of ACM Transactions on Computer-Human Interaction, vol. 6, Issue 2, Jun. 1999, pp. 95-132.

Datta, et al., "Proxy-Based Acceleration of Dynamically Generated Content on the World Wide Web: An Approach and Implementation", In Proceedings of ACM SIGMOD International Conference on Management of Data, Jun. 4, 2002, pp. 97-108.

Al, et al., "Spatial Relation Abstract in Map Generalization Process", In Proceedings of the 9th ACM international symposium on advances in geographic information systems, Nov. 9, 2001, 11 pages.

Fritzsche, et al., "Model Transformation Chains in Model-Driven Performance Engineering: Experiences and Future Research Needs", In Proceedings of Modellierung, Mar. 24, 2010, pp. 213-220, 8 pages.

Fritzsche, et al., "Systematic Usage of Embedded Modelling Languages in Automated Model Transformation Chains", In Proceedings of First International Conference Software Language Engineering, Sep. 29, 2008, 4 pages.

Liu, et al., "UI Portals: Sharing Arbitrary Regions of User Interfaces on Traditional and Multi-User Interactive Devices", In Proceedings of 9th International Conference on Ubiquitous Intelligence & Computing and 9th International Conference on Autonomic & Trusted Computing, Sep. 4, 2012, pp. 957-962.

Markarian, et al., "Seamless Interaction Among Heterogeneous Devices in Support for Co-located Collaboration", In Proceedings of the 12th International Conference on Groupware: Design, Implementation, and use, Sep. 6, 2006, 16 pages.

Nimphius, et al., "Building Customizable Oracle ADF Business Applications with Oracle Metadata Services (MDS)", In Oracle White Paper, Jun. 2010, 57 pages.

(56) References Cited

OTHER PUBLICATIONS

Qaddoura, Fareed, "Dynamic Website and Data Engine Generators for Distributed Enterprise/Business Architectures", In Thesis, Dec. 2004, 84 pages.
Richa, et al., "Towards Testing Model Transformation Chains Using Precondition Construction in Algebraic Graph Transformation", In Proceedings of 17th International Conference on Model Driven Engineering Languages & Systems, Sep. 29, 2014, 10 pages.
Schlatter, Tania, "Designing Personalized, Dynamic web Applications with ATG", Published on: Oct. 21, 2002 Available at: http://www.nimblepartners.com/share/atg_design_process.pdf.
Schwabe, et al., "Cohesive Design of Personalized Web Applications", In Journal of IEEE Internet Computing, vol. 6, Issue 2, Mar. 2002, pp. 34-43.
Shi, et al., "Finger Gesture Interaction on Large Tabletop For Sharing Digital Documents Among Multiple Users", In Proceedings of First IEEE International Conference on Ubi-Media Computing, Jul. 31, 2008, pp. 8-13.
Shurtz, S. Richard, "Application Sharing from Mobile Devices with a Collaborative Shared Display", In Thesis and Dissertations Brigham Young University, Jun. 5, 2014, 106 pages.
Sripradha, et al., "Dynamic Resource Management Using Gesture-Based User Interface", In Proceedings of 20th Annual International Conference on Advanced Computing and Communications, Sep. 19, 2014, 6 pages.
Stille, et al., "A2DL—An Adaptive Automatic Display Layout System", In Proceedings of Third Annual Symposium Human on Interaction with Complex Systems, Aug. 25, 1996, pp. 243-250.
Stirbu, Vlad, "A RESTful Architecture for Adaptive and Multi-device Application Sharing", In Proceedings of First International Workshop on RESTful Design, Apr. 26, 2010, 4 pages.
Vanhooff, et al., "Towards a Transformation Chain Modeling Language", In Proceedings 6th International Workshop Embedded Computer Systems: Architectures, Modeling, and Simulation, Jul. 17, 2006, 10 pages.
Vanhooff, et al., "UniTI: A Unified Transformation Infrastructure", In Proceedings of 10th International Conference on Model Driven Engineering Languages and Systems, Sep. 30, 2007, 15 pages.
Wang, et al., "PLA-based Runtime Dynamism in Support of Privacy-Enhanced Web Personalization", In Proceedings of 10th International Software Product Line Conference, Aug. 21, 2006, 10 pages.
Yie, et al., "Realizing Model Transformation Chain Interoperability", In Journal Software and Systems Modeling, Feb. 1, 2012, 21 pages.
Zee, et al., "Application of geographical concepts and spatial technology to the Internet of Things", Retrieved on: Jul. 9, 2015 Available at: http://dspace.ubvu.vu.nl/bitstream/handle/1871/47951/2013-33.pdf?.
"Application Transformation", Published on: May 4, 2014, Available at: http://www8.hp.com/us/en/business-solutions/application-transformation-overview.html.
"Configuring the Display of Portal Content", Published on: Jul. 6, 2013 Available at: https://help.sap.com/saphelp_nw73/helpdata/en/3f/4e286c29d3475ca4ebdaedac6f9ede/frameset.htm.
Deploying Multiple-Instance Applications, Retrieved on: Apr. 29, 2015, Available at: https://technet.microsoft.com/en-us/library/cc779351(v=ws.10).aspx.
"Pexpect—Spawn child applications and control them automatically.", Published on: Oct. 21, 2013 Available at: http://www.bx.psu.edu/~nate/pexpect/pexpect.html.
Office Action dated Jun. 10, 2016 cited in U.S. Appl. No. 14/791,153.
Bergstein, "Object-Preserving Class Transformations", ACM, pp. 299-313, 1991.
McGachey et al. "Classifying Java Class Transformations for Pervasive Virtualized Access", ACM, pp. 75-84, 2009.
International Search Report and Written Opinion for PCT/US2016/041211 dated Sep. 13, 2016.
Office Action dated Aug. 26, 2016 cited in U.S. Appl. No. 14/791,143.
Office Action dated Aug. 29, 2016 cited in U.S. Appl. No. 14/791,141.
International Search Report and Written Opinion for PCT/US2016/041212 dated Sep. 19, 2016.
International Search Report and Written Opinion for PCT/US2016/040234 dated Sep. 14, 2016.
International Search Report and Written Opinion for PCT/US2016/040233 dated Sep. 22, 2016.
Bhardwaj et al. "ECC: Edge Cloud Composites" 2014 2nd IEEE International Conference on Mobile Cloud Computing, Services, and Engineering, IEEE, Apr. 8, 2014, pp. 38-47.
Fujii et al. "Semantics-Based Context-Aware Dynamic Service Composition" ACM Transactions on Autonomous Adoptive System, vol. 4, No. 2, May 1, 2009.
Pering et al. "Enabling Pervasive Collaboration with Platform Composition" May 11, 2009, Pervasive Computing, Spirnger Berlin Heidelberg, pp. 184-201.
International Search Report and Written Opinion for PCT/US2016/040232 dated Sep. 20, 2016.
Troche "Refactoring with Eclipse: Eclipse Provides a Collection of Refactoring Features" Oct. 1, 2004.
International Search Report and Written Opinion for PCT/US2016/040231 dated Sep. 23, 2016.
International Search Report and Written Opinion for PCT/US2016/040238 dated Sep. 28, 2016.
International Search Report and Written Opinion for PCT/US2016/041213 dated Oct. 11, 2016.
International Search Report and Written Opinion for PCT/US2016/040235 dated Oct. 10, 2016.
International Search Report and Written Opinion for PCT/US2016/041214 dated Oct. 12, 2016.
International Search Report and Written Opinion for PCT/US2016/040595 dated Oct. 13, 2016.
International Search Report and Written Opinion for PCT/US2016/040239 dated Oct. 7, 2016.
International Search Report and Written Opinion for PCT/US2016/040240 dated Oct. 13, 2016.
Korkhov et al. "VLAM-G: Interactive Data Driven Workflow Engine for Grid-Enabled Resources", Scientific Programming, vol. 15, No. 3, Jan. 2007.
Lin et al. "Service-Oriented Architecture for VIEW: A Visual Scientific Workflow Management System", Services Computing, 2008.
Zhang et al. "CloudWF: A Computational Workflow System for Clouds Based on Hadoop" Dec. 2009, Cloud Computing, pp. 393-404.
Fei et al. "A Dataflow-Based Scientific Workflow Composition Framework" IEEE Transactions on Services Computing, vol. 5, No. 1, Jan. 2012.
U.S. Appl. No. 14/791,161, dated Oct. 17, 2016, Office Action.
U.S. Appl. No. 14/791,153, dated Nov. 8, 2018, Office Action.
International Search Report and Written Opinion for PCT/US2016/041215 dated Oct. 13, 2016.
Teamviewer "Manual TeamViewer 6.0—9947c" Dec. 1, 2010, retrieved Aug. 23, 2016, p. 50.
Nishizawa et al. "A Small Extension to Java for Class Refinement", ACM, pp. 160-165, 2008.
Etien et al. "Chaining Model Transformations", ACM, pp. 9-14, 2012.
Fuad et all. "Similarity Mapping of Software Faults for Self-Healing Applications", ACM, pp. 1-4, 2010.
Weidendorfer et al. "Performance Optimization by Dynamic Code Transformation", ACM, pp. 1-2, 2011.
U.S. Appl. No, 14/791,158, dated Dec. 2, 2016, Office Action.
U.S. Appl. No. 14/791,143, dated Dec. 23, 2016, Notice of Allowance.
Office Action dated Jan. 26, 2017 cited in U.S. Appl. No. 14/794,749.
"Second Written Opinion Received for PCT Application No. PCT/US2016/040233", dated Jan. 11, 2017, 10 pages.

(56) References Cited

OTHER PUBLICATIONS

Notice of Allowance dated Feb. 27, 2017 cited in U.S. Appl. No. 14/791,144.
Office action dated Feb. 28, 2017 cited in U.S. Appl. No. 14/791,151.
Notice of Allowance dated Apr. 12, 2017 cited in U.S. Appl. No. 14/791,153.
Sascha Hunold et al., "Transformation of Legacy Software into Client/Server Applications through Pattern-based Rearchitecturing", 2008.
Notice of Allowance dated Apr. 20, 2017 cited in U.S. Appl. No. 14/791,143.
Feinerer et al, "Class Diagrams with Equated Association Chains", IEEE, pp. 209-216, 2013.
Yu et al., "A Feature-Driven Approach to Automated Class Diagram Construction", ACM, pp. 1-9, 2015.
Vignaga et al., "Transforming System Operations' Interactions into a Design Class Diagram", ACM, pp. 993,997, 2007.
Magalhaes et al., "A Model Driven Transformation Development Process for Model to Model Transformation", ACM, pp. 3-12, 2016.
Notice of Allowance dated Apr. 25, 2017 cited in U.S. Appl. No. 14/791,141.
2nd Written Opinion issued in PCT Application No. PCT/US2016/040240 dated Apr. 20, 2017.
International Preliminary Report on Patentability issued in PCT Patent Application No. PCT/US2016/041211 dated May 15, 2017.
Dibon Pierre et al: "Ubiquitous Widgets: Designing Interactions Architecture for Adaptive Mobile Applications", Distributed Computing in Sensor Systems (DCOSS), May 20, 2013, pp. 331-336.
2nd Written Opinion issued in PCT Application No. PCT/US2016/040595 dated May 3, 2017.
2nd Written Opinion issued in PCT Application No. PCT/US2016/041215 dated Mar. 16, 2017.
2nd Written Opinion issued in PCT Application No. PCT/US2016/041212 dated Jun. 6, 2017.
Second Written Opinion Issued in PCT Application No. PCT/US2016/040231, dated May 22, 2017, 5 pages.
"Second Written Opinion Issued in PCT Application No. PCT/US2016/041213", dated May 29, 2017, 5 pages.
U.S. Appl. No. 14/791,158, dated Jun. 2, 2017, Office Action.
International Preliminary Report on Patentability issued in PCT Patent Application No. PCT/US2016/040595 dated Jul. 3, 2017.
International Preliminary Report on Patentability issued in PCT Patent Application No. PCT/US2016/040240 dated Jul. 11, 2017.
Second Written Opinion Issued in PCT Application No. PCT/US2016/040238, dated Jun. 16, 2017, 7 pages.
Baryer "Getting Started with the S Pen on the Samsung Galaxy Note 4", published: Oct. 30, 2014, cnet.com, https://www.cnet.com/how-to/how-to-samsung-galazy-note-4-s-pen/.
"Second Written Opinion Issued in PCT Application No. PCT/US2016/040232", dated May 29, 2017, 5 Pages.
U.S. Appl. No. 14/791,151, dated Jul. 13, 2017, Notice of Allowance.
U.S. Appl. No. 14/794,752, dated Jul. 10, 2017, Office Action.
U.S. Appl. No. 14/794,749, dated Jul. 13, 2017, Office Action.
U.S. Appl. No. 14/791,148, dated Aug. 2, 2017, Office Action.
"International Preliminary Report on Patentability" issued in PCT Application No. PCT/US2016/041212 dated Aug. 31, 2017.
"International Preliminary Report on Patentability" issued in PCT Application No. PCT/US2016/040233 dated May 9, 2017.
U.S. Appl. No. 14/791,158, dated Aug. 28, 2017, Office Action.
"International Search Report and the Written Opinion" issued in PCT Application No. PCT/US2016/040231 dated Sep. 25, 2017.
"International Preliminary Report on Patentability" issued in PCT Application No. PCT/US2016/040232 dated Sep. 6, 2017.
Office Action dated Oct. 2, 2017 cited in U.S. Appl. No. 14/794,747.
U.S. Appl. No. 14/794,752, dated Dec. 4, 2017, Office Action.
U.S. Appl. No. 14/791,148, dated Dec. 29, 2017, Office Action.
International Preliminary Report on Patentability issued in PCT Application No. PCT/US2016/040238, dated Oct. 11, 2017, 8 pages.
"International Preliminary Report on Patentability issued in PCT Application No. PCT/US2016/041215," dated Oct. 17, 2017.
U.S. Appl. No. 14/791,162, dated Nov. 9, 2017, Office Action.
Notice of Allowance dated Mar. 15, 2018 cited in U.S. Appl. No. 14/794,748.

\* cited by examiner

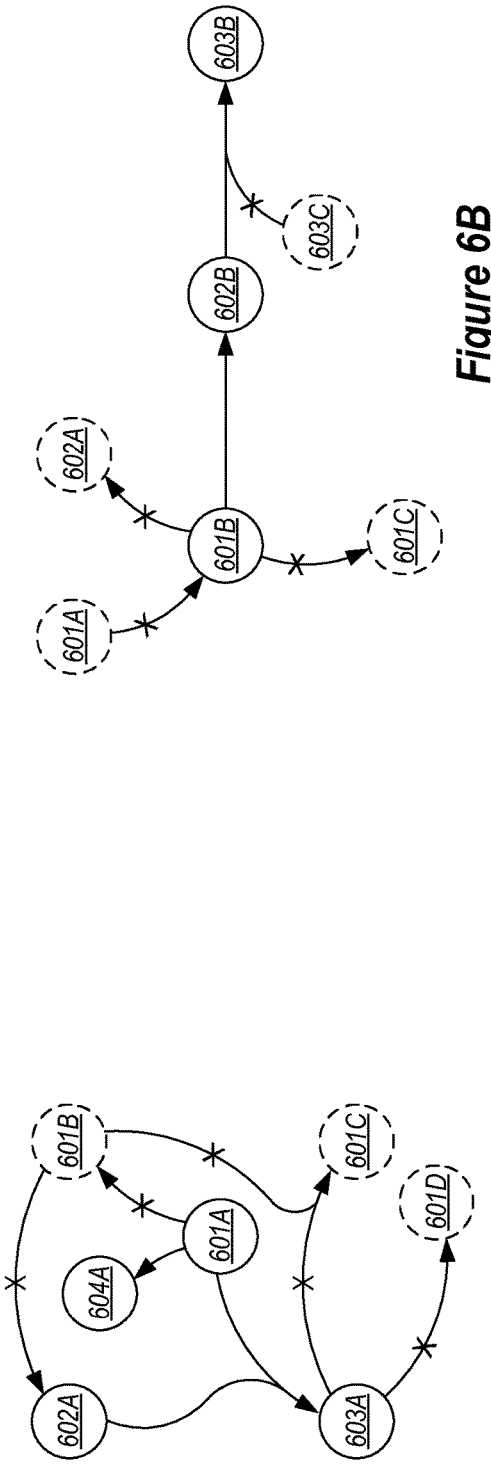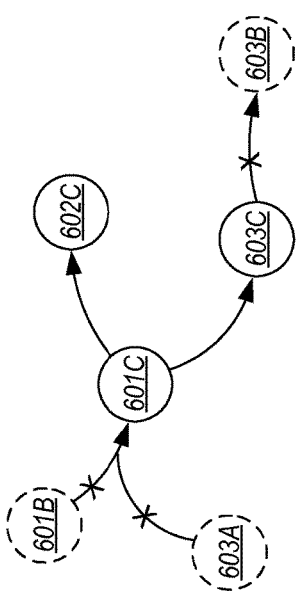
*Figure 6A*
*Figure 6B*
*Figure 6C*
*Figure 6D*

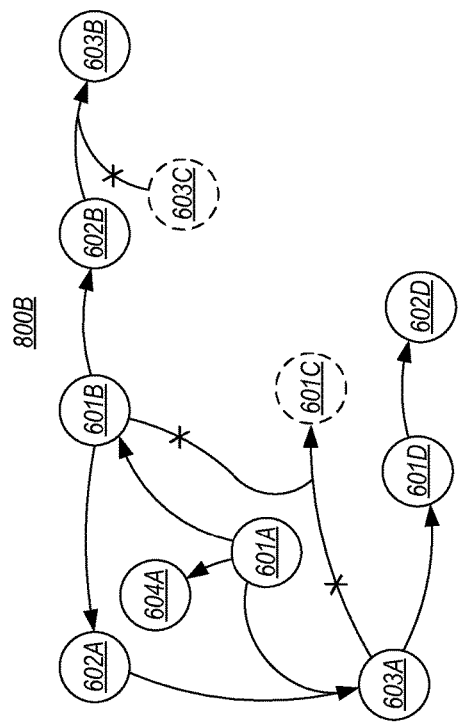
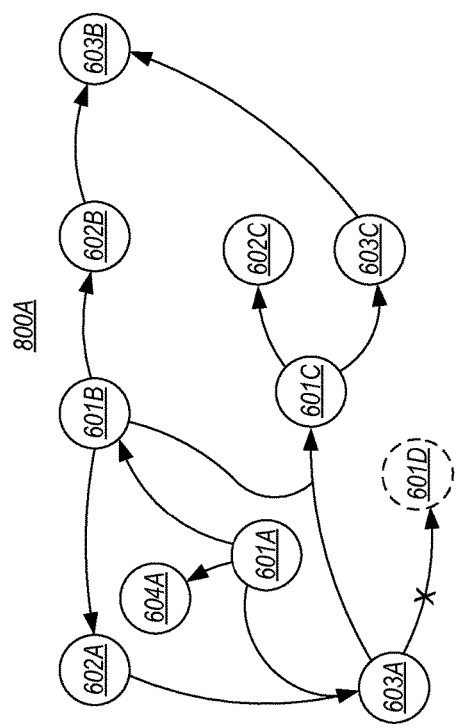
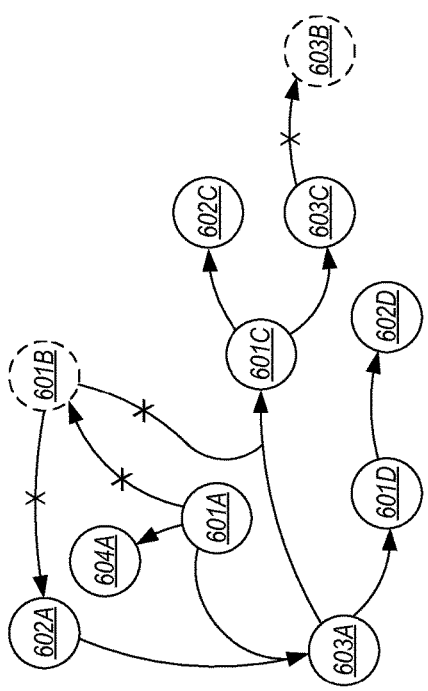

APPLICATION OPERATION RESPONSIVE TO OBJECT SPATIAL STATUS

BACKGROUND

Computing technology has revolutionized the way we work, play, and communicate. Computing functional is obtained by a device or system executing software or firmware. The typical paradigm for application preparation is that the application is drafted well in advance of its use, and the functionality of the patent application is relatively predetermined.

There are some exceptions to the predetermined functionality. For instance, patches may be made to software application in order to provide repair of previously unknown bugs in the software. Furthermore, updates to software applications may be provided in order to add new functionality to the software application. In some cases, software may be configured and customized for a particular user. However, the application itself defines how far it can be customized. Users can also affect applications by providing commercial feedback on software performance. However, it can take years before user feedback is properly incorporated into an application.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a method for operating an application in response to spatial status of objects within a physical environment in which the application operates. A system detects the spatial status (e.g., orientation, movement, position, and so forth) of multiple environmental objects that operate within a physical environment from which input is provided to, and to which output is provided from, an application. The relationship between at least some different environmental objects result in altered behavior of the application. The spatial status of at least some of the environmental objects is subject to change. Examples of change to the behavior of the application include changing an input status of one or more input devices within the environment, changing an output status of one or more output devices within the environment, augmenting the application to include additional logic, splitting the application, and so forth. Thus, a mechanism is described that allows an application to adjust in a manner that is highly responsive to the physical environment in which the application interfaces.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 6A through 6D each illustrate example transformation chains (arrows through which data does not flow absent joining with another transformation chain are illustrated with an "X", and dependency elements that are not nodes in the transformation chain itself are illustrated with dashed lined borders);

FIG. 8A illustrates an augmented transformation chain representing the joining of the transformation chains of FIGS. 6A, 6B and 6C;

FIG. 8B illustrates an augmented transformation chain representing the joining of the transformation chains of FIGS. 6A, 6B and 6D;

FIG. 8C illustrates an augmented transformation chain representing the joining of the transformation chains of FIGS. 6A, 6C and 6D;

DETAILED DESCRIPTION

At least some embodiments described herein relate to a method for operating an application in response to spatial status of objects within a physical environment in which the application operates. A system detects the spatial status (e.g., orientation, movement, position, and so forth) of multiple environmental objects that operate within a physical environment from which input is provided to, and to which output is provided from, an application. The relationship between at least some different environmental objects result in altered behavior of the application. The spatial status of at least some of the environmental objects is subject to change. Examples of change to the behavior of the application include changing an input status of one or more input devices within the environment, changing an output status of one or more output devices within the environment, augmenting the application to include additional logic, splitting the application, and so forth. Thus, a mechanism is described that allows an application to adjust in a manner that is highly responsive to the physical environment in which the application interfaces.

Figure 1:
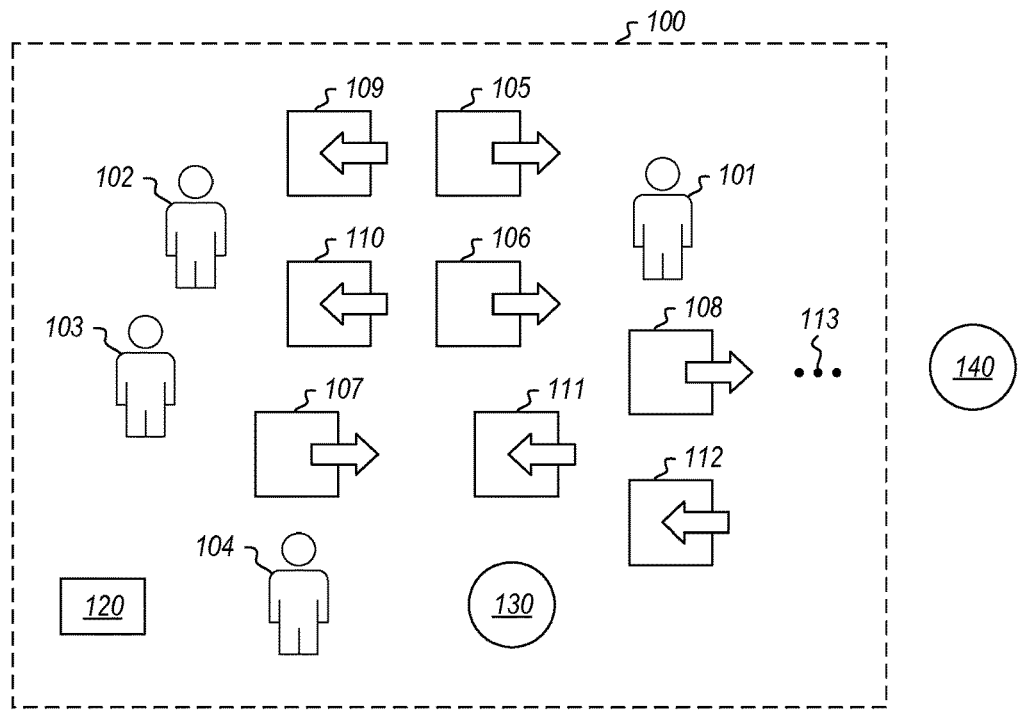
FIG. 1 symbolically illustrates an example physical environment in which an application may operate.

FIG. 1 illustrates an example physical environment 100 in which an application may operate. The physical environment 100 includes environmental objects 101 through 112, although the ellipses 113 represent that there may be any number of environmental objects within the physical environment 100. The application itself is represented symbolically as application 120. More regarding possible implementations of the application 120 will be described further below.

The physical environment 100 corresponds to the application 120 in that information is provided to the application 120 from the physical environment 100 and/or the application 120 provides information to the physical environment 100. The physical environment 100 includes users 101 through 104. The users 101 through 104 may be human beings and thus are capable of providing input from the physical environment 100 to the application 120, and consuming information provided by the application 120.

The physical environment 100 also includes output devices 105 through 108 that are capable of rendering output from the application 120. There is no limit to the type of device or system that the output devices may be. As an example, the output devices may be displays, projectors, speakers, actuators, valves, robots, lights, drones, tactile devices, or any other device capable or rendering output from an application 120.

The physical environment 100 also includes input devices 109 through 112 that are capable of providing input to the application 120. There is also no limit to the type of device or system that the input devices may be. As an example, the input devices may be a microphone, microphone array, keyboard, keypad, touchscreen, pressure sensors, thermometers, barometers, noise sensors, light sensors, or any other device that is able to detect information generated in the physical environment 100.

Each of the environmental objects 101 through 113 have a spatial status within the physical environment 100. The spatial status of an environment object may comprise information such as orientation of the environment object, a position of the environmental object, a change in rate in orientation of the environmental object, a velocity of the environmental object, and so forth.

An orientation of the environmental object will convey different information depending on the type environment object. For instance, if the environmental objects are human users, then the orientation may convey a direction in which the user is looking, or perhaps a region of the environment where the user seems to be giving attention. If the environment object is an input device, then the orientation may convey a region of the environment from which input is most conveniently received. If the environmental object is an output device, then the orientation may convey a region of the environment to which output may be provided with best utilization.

The position of the environmental object (in the case of a user) may likewise convey information from which it may be determined a region of the environment to which the user appears to be paying attention. The position of an environmental object (in the case of an input device or an output device) may also be used to determine a region of most effective input or output.

A change in rate of orientation or a velocity of the environmental object may be used to forecast regions of interest (and input and output capability) for a user at some imminent future time. If an input or output device has a change in orientation or a velocity, such may be considered in forecasting an imminent future area of most efficient input and output within the environment.

The environment 100 also includes one or more spatial sensors symbolically represented in FIG. 1 as spatial sensor 130. As an example, the spatial sensor may be a vision system, or a combination of vision sensors that sample the environment periodically or continuously to determine the spatial status of each of the environmental objects.

The environment 100 also includes processing 140. The processing 140 capability may be local to the environment 100, or may be remote from the environment 100. The processing 140 may also be distributed with part located locally and part located remotely. Even the remote portion of the processing 140, if there is remote processing, may be distributed. As an example, remote portion of the processing may perhaps be performed in a cloud computing environment.

In this description and the following claims, "cloud computing" is defined as a model for enabling ubiquitous, convenient, on-demand network access to a shared pool of configurable computing resources (e.g., networks, servers, storage, applications, and services). The shared pool of configurable computing resources can be rapidly provisioned via virtualization and released with low management effort or service provider interaction, and then scaled accordingly. A cloud computing model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). In this description and in the claims, a "cloud computing environment" is an environment in which cloud computing is employed. Often, cloud computing environments are supported by datacenters.

Figure 2:
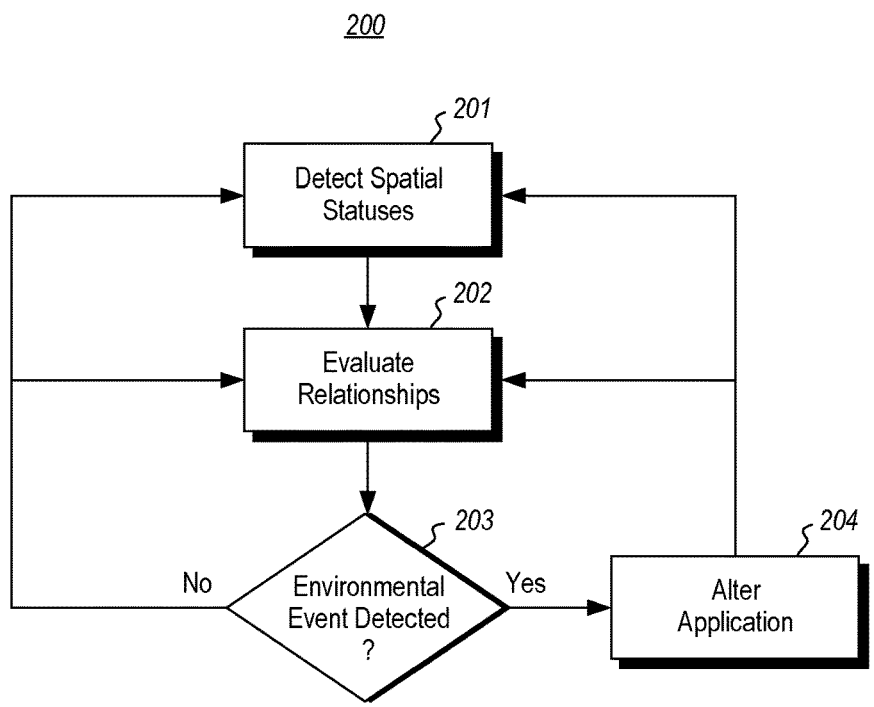
FIG. 2 illustrates a flowchart of a method for operating an application in response to spatial status of a plurality of environment objects within a physical environment in which the application operates.

FIG. 2 illustrates a flowchart of a method 200 for operating an application in response to spatial status of a plurality within a physical environment in which the application operates. For instance, the method 200 may be performed with respect to the application 120 and the environment 100 of FIG. 1. Because some or all of the spatial status of the environment objects within the environment may change, the method 200 may be repeatedly performed in order to detect changes in spatial statuses of the environmental objects within the physical environment of the application. Furthermore, environmental objects may enter and leave the environment of the application. For instance, human beings have freedom of movement. Accordingly, the method 200 may be performed repeatedly or continuously in order to gain a relatively real time sense of the spatial status of the environmental objects.

First, a computing system automatically detects a spatial status (act 201) of environment objects that operate within the physical environment of the application. Referring to FIG. 2, the spatial sensor 130 may detect the spatial status of the environmental objects 101 through 113, perhaps on a repeated or continuous basis. Furthermore, a computing system evaluates the relationship between the spatial status of various of the environmental objects (act 202). When certain environmental events are detected ("Yes" in decision block 203) based on the evaluation (of act 202), the application behavior is altered (act 204). If the certain environmental events are not detected ("No in decision block 203), then the spatial status detection (act 201) and/or the relationship evaluation (act 202) may simply continue until an environmental event is detected that results in altering of the application behavior (act 204). The method 200 may continue after altering the application to see if further alterations are warranted in light of newly detected environmental events.

The evaluation (act 202) may be performed by the spatial sensor 130 and/or the processing 140. Likewise, the detection of environmental events (decision block 203) may be performed by the spatial sensor 130 and/or the processing 140. Also, the altering of the application (act 204) may be performed by the spatial sensor 130 and/or the processing 140.

Various examples of environmental events, and the altering of the application will be described further below with respect to FIGS. 3 through 27 in the context of the application being a transformation chain. However, examples of altering the behavior of the application include, amongst other things, joining the application with one or more additional application portions, splitting the application, changing the output status of an output device within the environment, changing the input status of an input device within the environment, and so forth.

A Specific and Non-Limiting Environment

The principles described herein are not limited to the application 120 being a transformation chain application. Nevertheless, application 120 may be a transformation application as described herein. Accordingly, the structure, operation, and support for a transformation chain application will now be described. First, the concept of transformation chains will be described with respect to FIGS. 3 through 10. Then, an architecture for supporting a universe of transformation chains and their operation will be described with respect to FIG. 11. Thereafter, an example operation of transformation chains will be described with respect to FIGS. 12 through 26. Because transformation chain-based applications represent a paradigm shift, this description will go into significant detail on potential operations of the transformation chain-based applications. Thereafter, an example computing system that may support aspects described herein will be described with respect to FIG. 27.

The Transformation Chain Application

The principles described herein operate using a transformation chain. A transformation chain is an interconnected set of nodes that each may represent data sources and/or data targets. There are links between the nodes, each link representing a transformation. For any given link, the associated transformation receives copies of values of one or more data sources situated at an input end to the link, and generates and provides resulting values at one or more data targets located at the output end of the link. For any given transformation, when a value at one or more of the data sources at its input end changes, the transformation is automatically reevaluated, potentially resulting in changes in value(s) of one or more data targets at the output end of the transformation.

In one embodiment, regardless of how complex the transformation chain is, the transformations may be constructed from declarative statements expressing equations, rules, constraints, simulations, or any other transformation type that may receive one or more values as input and provide resulting one or more values as output. An example of a transformation chain is a spreadsheet program, where any of the cells can be a data source or a data target. An equation (i.e., a transformation) may be associated with any cell to cause that cell to be a data target where results of the equation are placed.

Figure 3:
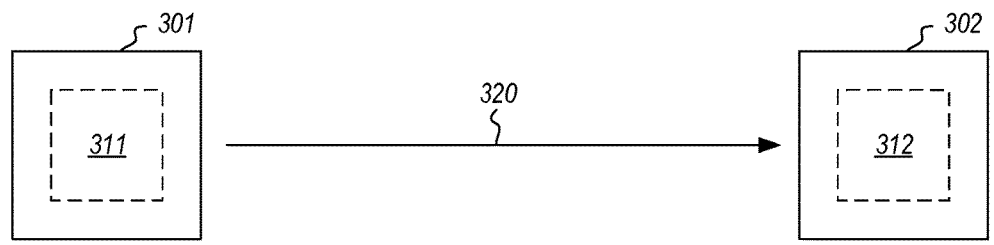
FIG. 3 symbolically illustrates a simple transformation chain in which there is but a single link coupling a single data source and a single data target and in which a transformation represented by the link is automatically performed using a value in the data source as input to generate a value in the data target.

As an example only, FIG. 3 illustrates a simple transformation chain 300 in which there is but a single link 320. In the drawing notation used throughout this description, a link will be illustrated as an arrow, with the input end being represented as the tail of the arrow, and the output end being represented as the head of the arrow. In cases in which there are multiple data sources at the input end of the link, the arrow will be represented with multiple tails. Copies of the values of the data source(s) at the tail(s) of the arrow represent input to the transformation. In cases in which there are multiple data targets affected by resulting value(s) of the transformation, the arrow will be represented with multiple heads. The values of the data target(s) at the head(s) of the arrow represent output from the transformation.

For instance, FIG. 3 illustrates a simple transformation chain 300 that includes a data source 301, a data target 302, and a single link 320. The link 320 represents a transformation performed on a copy of the value 311 at the data source 301 in order to generate a value 312 at the data target 302. Should the value 311 change, the transformation represented by link 320 is automatically reevaluated potentially resulting in a change in the value 312 in the data target 302.

Figure 4:
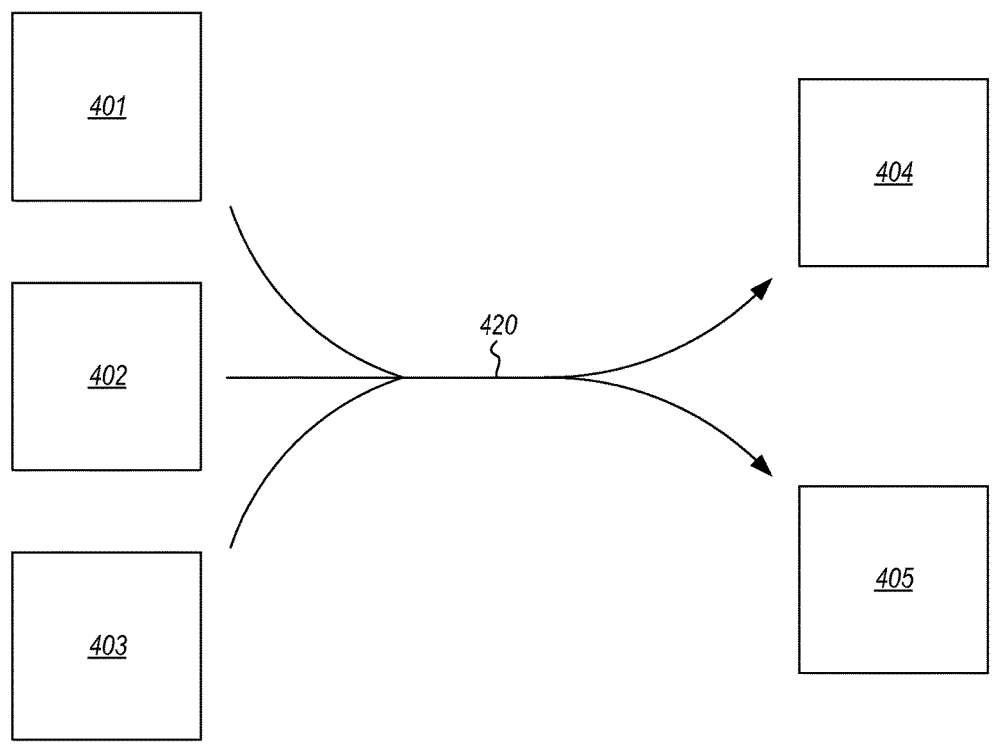
FIG. 4 symbolically illustrates another simple example transformation chain in which a transformation is performed using input values from three data sources in order to generate output values in two data targets.

FIG. 4 illustrates another simple example transformation chain 400 that includes three data sources 401, 402 and 403; two data targets 404 and 405, and a single link 420. The link 420 represents a transformation performed on copies of the values within the data sources 401, 402 and 403, in order to generate the values in the data targets 404 and 405. Should any of the values within the data sources 401, 402 or 403 change, the transformation link 420 is automatically reevaluated potentially resulting in a change in the values within any one or more of the data targets 404 and 405.

Figure 5:
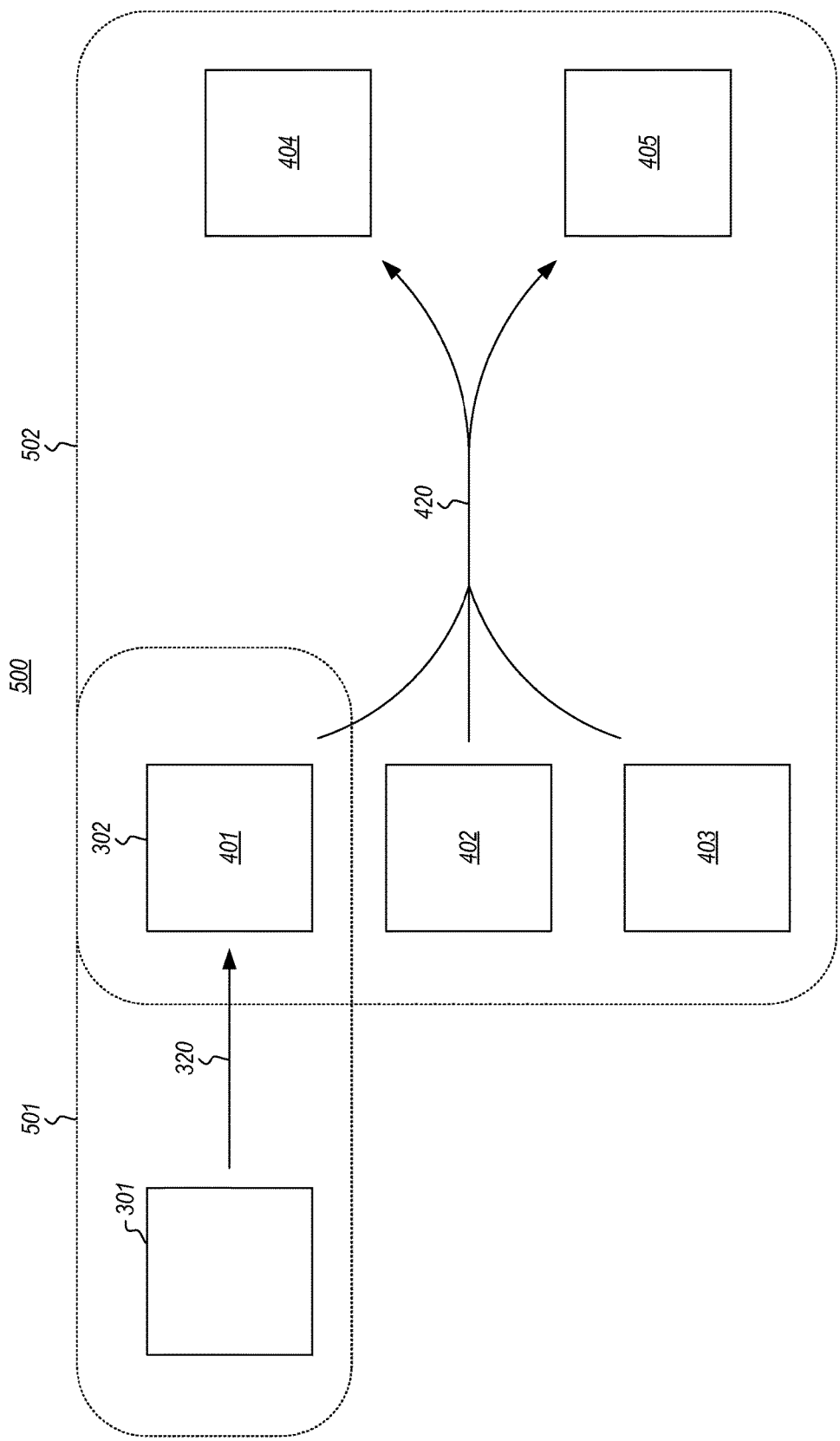
FIG. 5 illustrates a transformation chain in the form of a combination of the transformation chain of FIG. 3 and the transformation chain of FIG. 4.

FIG. 5 illustrates another example transformation chain 500, and illustrates the principle that transformation chains may build on each other in which a data source to one link may be a data target in other link, in order to create even more complicated transformation chains. For instance, the transformation chain 500 includes an instance 501 of the transformation chain 300, and an instance of 502 of the transformation chain 400. In this case, the data target 302 of the link 320 is also a data source 401 of the link 420. Should the value with the data source 301 change, the transformation represented by link 320 is reevaluated potentially resulting in a change in the value in the data target 302, which is likewise a data source 401 for the next link 420. Likewise, a change in a value of data source 401 would result in the transformation link 420 being reevaluated potentially resulting in a change in the values within any one or more of the data targets 404 and 405. Thus, a change in the value at data source 301 has the potential, through transformation reevaluation, to affect value(s) at node 302 (401) and at nodes 404 and 405. Data targets 404 and 405 might likewise represent data sources for yet other links. Accordingly, in complex transformation chains, a value change might cause propagated value changes through multiple nodes in a transformation chain through proper automated reevaluation of transformations within the transformation chain.

While the example transformation chain 500 includes just two links, transformation chains may be quite complex and involve enumerable nodes and associated links connecting those enumerable nodes. The principles described herein may operate regardless of the complexity of the transformation chains.

FIG. 6A through 6D illustrates example transformation chains instances or classes 600A through 600D. The instances will have the same structure as the classes, and so the illustrated forms may be considered to represent transformation classes as well as transformation instances. Instances will, however, have particular instance state associated with each of one or more of the nodes of the transformation chain. Accordingly, elements 600A through 600D may be referred to as transformation chain classes or transformation chain instances. The term "transformation chain" will be used to generally refer to both transformation chain classes and their associated transformation chain instances.

The example transformation chains 600A through 600D are relatively simple in order to avoid obscuring the broader principles described herein with an overly complex example. That said, the principles described herein apply regardless of how complex the transformation chain, and regardless of the number of transformation chains and associated devices that are within the environment and forming the compound application.

In the notation of FIGS. 6A through 6D, the nodes that belong to the transformation class 600N (where N ranges from A through D) are represented using the suffix N. For instance, in FIG. 6A, the transformation chain 600A includes nodes 601A, 602A, 603A, and 604A. The remaining elements 601B, 601C and 601D do not end with the "A" suffix, and thus are not nodes within the transformation chain 600A. Instead, the elements 601B, 601C and 601D represent dependencies with other transformation chains.

Throughout FIGS. 6A through 6D, 7A through 7D, 8A through 8C, and 9, to emphasize those elements that are dependency elements, rather than nodes in the transformation chain itself, dependency elements are represented with dashed-lined boundaries. Data does not flow from a node to a dependency element unless the transformation chain is joined with another transformation chain that includes a node represented by the dependency element. The fact that data cannot flow along a particular transformation is represented throughout the figures by the link being marked with an "X".

For instance, element 601B in transformation chain 600A represents a dependency with node 601B in the transformation chain 600B. The dependency element 601B is bordered with dashed lines, and all links leading to or from that dependency element 601B are marked with an "X" since at this stage, the transformation chain 600A is not joined with the transformation chain 600B. Element 601C in transformation chain 600A represents a dependency with node 601C in transformation chain 600C. Element 601D in transformation chain 600A represents a dependency with node 601D in transformation chain class 600D.

On its own, the transformation chain instance 600A can function as an application. For example, a copy of a value or copies of values from data source 601A may be used to form a transformed result as a value or values of data target 604A. Furthermore, a copy of a value or copies of values from data sources 601A and 602A may be transformed to result in a value or values of data target 603A. If the transformation chain instance 600A is on its own, the transformations leading to and from the elements 601B, 601C and 601D are not evaluated.

The transformation chain 600B includes three nodes 601B, 602B and 603B. However, the transformation chain 600B also includes dependency elements 601A, 602A, 601C and 603C that reference a node in a different transformation chain. Again, the transformation chain instance 600B may operate independently as a single application. For example, a copy of a value or copies of values from data source 601B may be provided through a transformation to generate a resulting value or values for data target 602B. A copy of a value or copies of values from the data source 602B may be provided through a transformation to generate a resulting value or values for data target 603B.

Figure 7B:
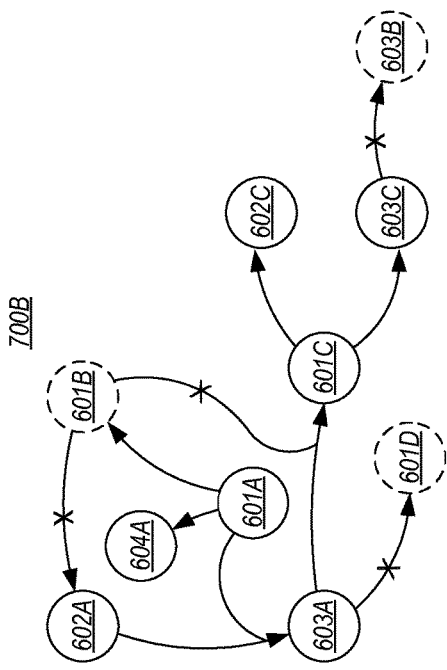
FIG. 7B illustrates an augmented transformation chain representing the joining of the transformation chains of FIGS. 6A and 6C.
Figure 7D:
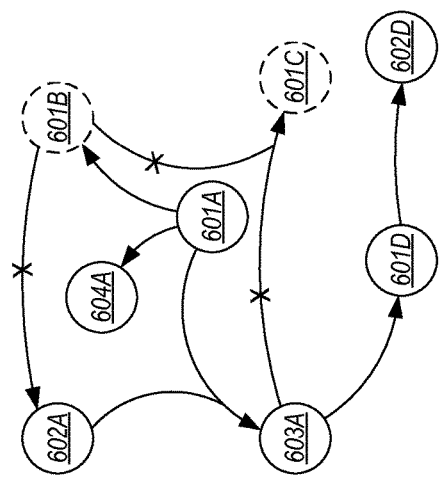
FIG. 7D illustrates an augmented transformation chain representing the joining of the transformation chains of FIGS. 6A and 6D.
Figure 7A:
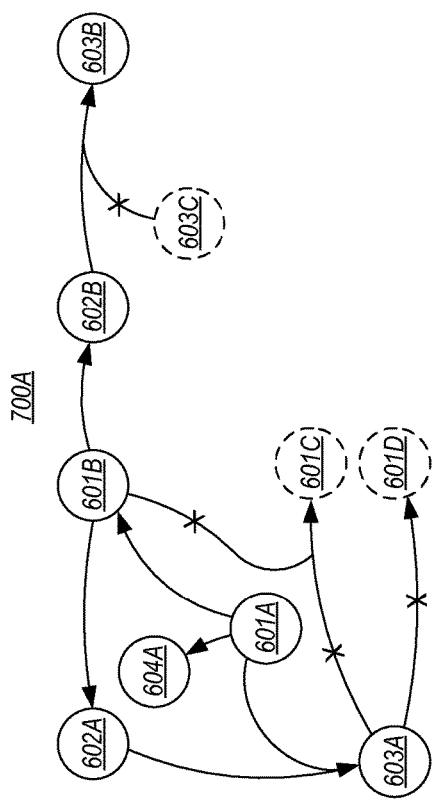
FIG. 7A illustrates an augmented transformation chain representing the joining of the transformation chains of FIGS. 6A and 6B.

Though the transformation chain instances 600A and 600B may operate independently, FIG. 7A illustrates a joined transformation chain 700A that includes transformation chain 600A joined with transformation chain 600B. Where appropriate, dependency elements in each of the transformation chains are now replaced with the actual node referred to. For example, dependency element 601B of FIG. 6A is now node 601B in FIG. 7A, and dependency elements 601A and 602A of FIG. 6B are now nodes 601A and 602A, respectively, in FIG. 7A. Thus, all of the nodes that have the suffix A or B are nodes within the transformation chain 700A, and only those nodes that have suffixes C or D are dependency elements. For example, nodes 601A, 602A, 603A, 604A, 601B, 602B and 603B are nodes within the augmented transformation chain 700A, and the functionality of the compound application becomes somewhat better, more complete, or at least different than the sum of the functionality of the individual transformation chains 600A and 600B on their own.

The transformation chain 600C includes three nodes 601C, 602C and 603C. However, the transformation chain 600C also includes dependency elements 603A, 601B and 603B that reference a node in a different transformation chain. Again, the transformation chain instance 600C may operate independently as a single application. For example, a copy of a value or copies of values from data source 601C may be provided through a transformation to generate a resulting value or values for data target 602C. Likewise, a copy of a value or copies of values from the data source 601C may also be provided through a transformation to generate a resulting value or values for data target 603C.

Though transformation chain instances 600A and 600C may operate independently, FIG. 7B illustrates a joined transformation chain 700B that includes transformation chain 600A joined with transformation chain 600C. Dependency elements in each of the transformation chains are now replaced with the actual node referred to the extent that the dependency element refers to a node within any of transformation chains 600A or 600C. Now all of the nodes that have the suffix A or C are nodes within the transformation chain, and only those nodes that have suffixes B or D are dependency elements. For example, nodes 601A, 602A, 603A, 604A, 601C, 602C and 603C are nodes within the augmented transformation chain 700B. The functionality of the compound application becomes better, more complex, or at least different than the sum of the functionalities of the individual transformation chain instances 600A and 600C.

Figure 7C:
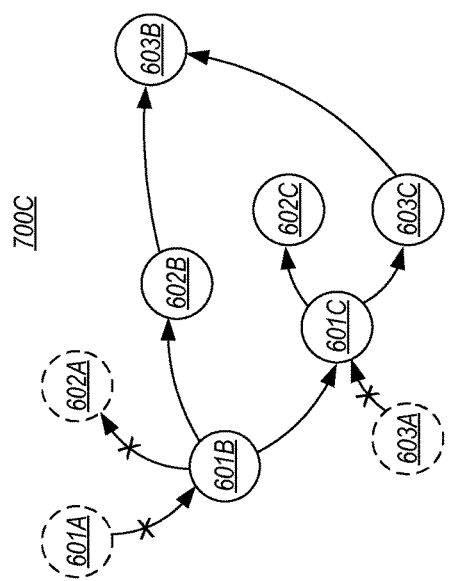
FIG. 7C illustrates an augmented transformation chain representing the joining of the transformation chains of FIGS. 6B and 6C.

FIG. 7C illustrates a joined transformation chain 700C that includes transformation chain class 600B joined with transformation chain class 600C. Dependency elements in each of the transformation chains are replaced with the actual node referred to the extent that the dependency element refers to a node within any of transformation chains 600B or 600C. Now all of the nodes that have the suffix B or C are nodes within the transformation chain, and only those nodes that have suffixes A or D are dependency elements. For instance, nodes 601B, 602B, 603B, 601C, 602C and 603C are nodes within the augmented transformation chain 700C, and the functionality of the compound application becomes better, more complex, or at least different than the sum of the functionalities of the individual transformation chain instances 600B and 600C.

FIG. 8A illustrates a joined transformation chain 800A that includes transformation chains 600A, 600B and 600C also being joined. Dependency elements in each of the transformation chains are replaced with the actual node referred to the extent that the dependency element refers to a node within any of transformation chains 600A, 600B or 600C. Note that all of the illustrated nodes are actually nodes in the transformation chain, except for dependency element 601D. The functionality of the compound application becomes better, more complex, or at least different than the sum of the functionality of the individual transformation chains 600A, 600B and 600C; the sum of the functionality of the individual transformation chains 700A and 600C; or the sum of the functionality of the individual transformation chains 600A and 700B.

The transformation chain 600D includes two nodes 601D and 602D. However, the transformation chain 600D also includes a single dependency element 603A referencing a node in a different transformation chain class 600A. Again, instances of the transformation chain class 600D may operate independently as a single application. For instance, a copy of a value or copies of values from data source 601D may be provided through a transformation to generate a resulting value or values for data target 602D.

Though transformation chain instances 600A and 600D may operate independently, FIG. 7D illustrates a joined transformation chain 700D that includes transformation chain 600A joined with transformation chain 600D. Dependency elements in each of the transformation chains are now replaced with the actual node referred to the extent that the dependency element refers to a node within any of transformation chains 600A or 600D. Now all of the nodes that have the suffix A or D are nodes within the transformation chain, and only those nodes that have suffixes B or C are dependency elements. For instance, nodes 601A, 602A, 603A, 604A, 601D and 602D are nodes within the augmented transformation chain 700D, and the functionality of the compound application becomes somewhat better than the sum of the functionality of the individual transformation chain 600A and 600D.

Note that FIGS. 7A through 7D illustrate all of the possible permutations involving two and only two of the transformation chains 600A, 600B, 600C and 600D. The transformation chains 600B and 600D are not joined directly in a two transformation chain combination, since neither transformation chain has a dependency element referring to a node in the other transformation chain. Furthermore, transformation 600C and 600D are not joined directly in a two transformation chain combination, since neither has a dependency reference to the other.

Figure 9:
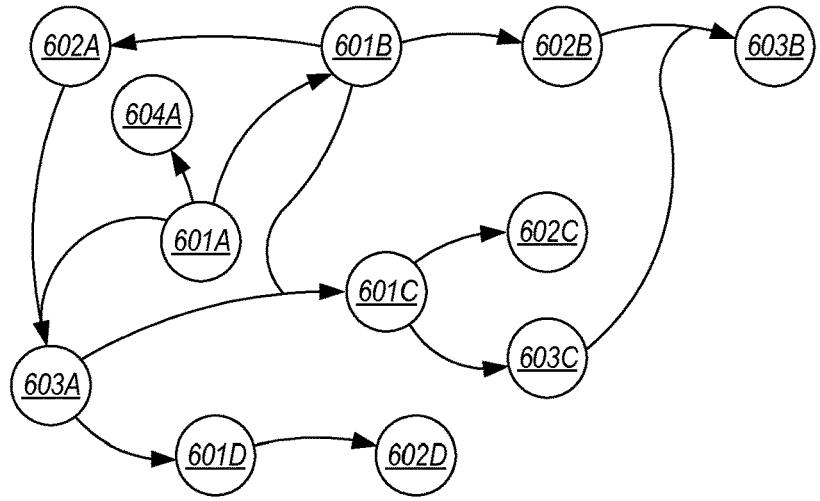
FIG. 9 illustrates an augmented transformation chain representing the joining of the transformation chains of FIGS. 6A, 6B, 6C and 6D.

FIG. 8A illustrates one of three possible combinations of three and only three transformation chains 600A, 600B, 600C and 600D. In particular, FIG. 8A illustrates an augmented transformation chain 800A that combines transformation chains 600A, 600B and 600C. FIG. 8B illustrates an augmented transformation chain 800B that combines transformation chains 600A, 600B and 600D (in which all nodes are part of the transformation chain except dependency elements 601C and 603C). FIG. 8C illustrates an augmented transformation chain 800C that combines transformation chains 600A, 600C and 600D (in which all nodes are part of the transformation chain except dependency elements 601B and 603B). Note that there is no combination of transformation chains 600B, 600C, and 600D illustrated since the transformation chain 600D includes no dependency references to transformation chain 600B (or vice versa), or to transformation chain 600C (or vice versa). FIG. 9 illustrates a combined transformation chain 900 that includes all of the transformation chains 600A, 600B, 600C and 600D combined.

Accordingly, given the transformation chains 600A, 600B, 600C and 600D in the environment, there are 8 possible compound applications that may be formed (corresponding to the transformation chains of FIGS. 7A through 7D, FIGS. 8A through 8C, and FIG. 9). Thus, as the transformation chains of various devices are joined into and decoupled from the environment, the very transformation chain itself changes, and the structure of the compound application thereby changes. For instance, a change in the value of data source 601A might have a very different impact on the transformation chain as the effects of that change are automatically propagated through one or more transformations, depending on whether that data source 601A is within transformation chain 600A alone, within transformation chain 700A, within transformation chain 700B, within transformation chain 700D, within transformation chain 800A, within transformation chain 800B, within transformation chain 800C, or within transformation chain 900.

Any of the nodes of a transformation chain may have zero or more input endpoints where inputs are received from an endpoint interface entity, and zero or more output endpoints where outputs are provided to an endpoint interface entity. In this description and in the claims, an "endpoint interface entity" is defined as a hardware entity and zero of more environmental criteria. In the case of there being zero environmental criteria associated with an endpoint interface entity, the endpoint interface is simply a hardware entity ((such as a device or computing system). In the description and in the claims, "a hardware entity" refers to any single or combination of physical items that have the capability to potentially interface with an endpoint. For instance, a hardware entity that provides input or receives input might be a data store, or a location in a data store, a user device, a microphone or microphone array, a camera or camera array, three-dimensional sensors, image recognizers, or the like. If the hardware entity and corresponding one or more environmental criteria together define an endpoint interface entity, then the hardware entity is indeed the endpoint interface entity so long as the environmental criteria are satisfied. However, if the environmental criteria cease to be satisfied, then the hardware entity would lose its status as an endpoint interface entity.

In this description, the terms "endpoint interface entity" and "hardware entity" may frequently be used interchangeably on the assumption that if the endpoint interface entity does have environmental criteria, that those criteria remain satisfied in that case. Furthermore, when the term "environmental criteria" is mentioned with respect to a hardware entity or an endpoint interface entity, the environmental criteria for the hardware entity becoming the endpoint interface entity may be different than the environment criteria for the hardware entity ceasing to be the endpoint interface entity. Thus, there may be some hysteresis built into the environmental criteria to avoid rapid changes in whether or not a particular hardware entity qualifies as a particular endpoint interface entity.

Examples of environmental criteria will now be provided with the understanding that the principles described herein are not limited to any particular environment criteria. One environmental criterion might be that the hardware entity has an associated identified user or identified group of users. For instance, if a given user or group of users is using a hardware entity, then the hardware entity may become an endpoint interface entity. If another user or group of users is using the hardware entity, then perhaps the hardware entity does not act as an endpoint interface entity. Other examples of environmental criteria might include the position, vantage point, or orientation of a user or group of users within an environment and/or with respect to a hardware entity, the position of an audio source in the environment, background noise levels, whether an audio signature is present, whether a security zone surrounding the environment has been violated, whether an individual has fallen in the environment, the temperature of the environment, the available network connections in the environment, a lighting level and/or configuration, a time of day or week or month or year, and so on for any imaginable environmental criteria.

As an example, a mounted flat panel display having multiple viewers oriented to be able to see the flat panel display might be an appropriate endpoint interface device, but if there is but a single viewer, and the node has input endpoints, perhaps a touchscreen device in the hands of the single viewer might be the better endpoint interface device for a given endpoint. As a second example, suppose that there was output was being displayed on a television, and a security system is activated, the activation of the security system might be an environmental criteria that causes some or all of the information displayed on the television to be obscured, or perhaps even cause the television to stop being an endpoint interface entity, and thus disconnect from the application.

Figure 10:
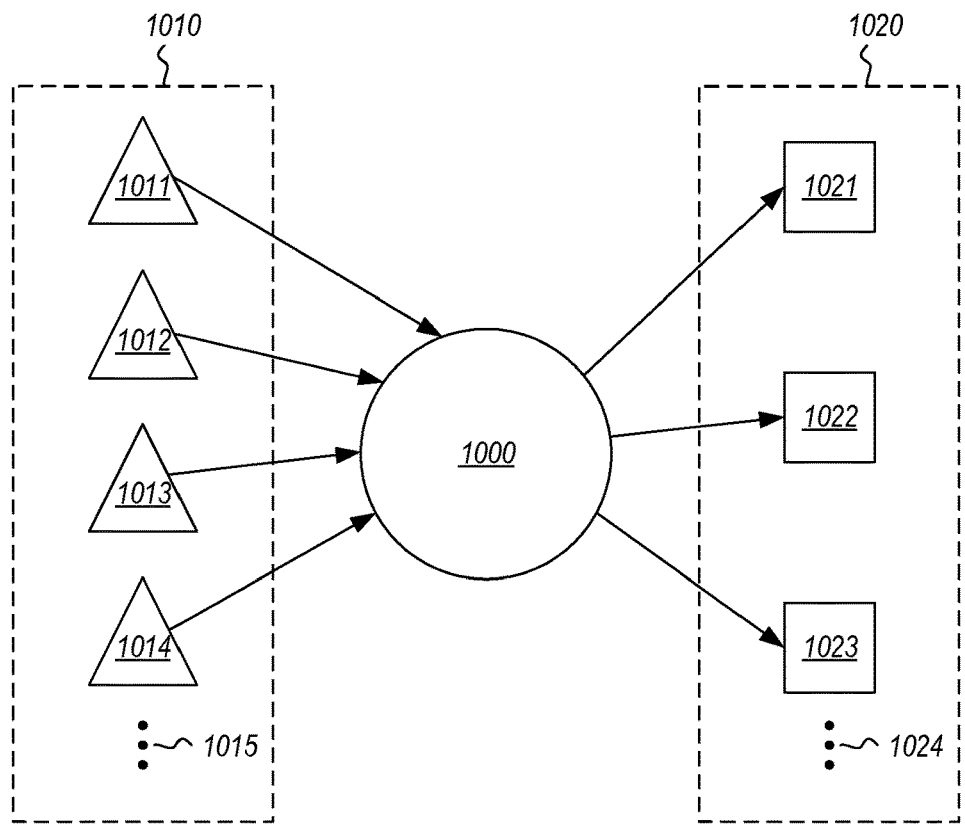
FIG. 10 illustrates a node of a transformation chain along with numerous associated input endpoints and output endpoints.

FIG. 10 illustrates a node 1000 of a transformation chain that includes input endpoints 1010 and output endpoints 1020. The input endpoints 1010 are illustrated as including endpoints 1011 through 1014, are represented as triangles, with the ellipses 1015 representing that the node 1000 may have any number of input endpoints. The output endpoints 1020 are illustrated as including endpoints 1021 through 1023, are represented as squares, with the ellipses 1024 representing that the node 1000 may have any number of output endpoints. The number and type of input and output endpoints may be defined by the transformation chain class(es) that include the node, or the class may provide flexibility in how many input and/or output endpoints are included with each instance of node 1000 in its respective instances of those transformation chain class(es). The endpoints themselves may be considered to be trivial nodes of a transformation class as all they do is provide output to, or receive input from a respective endpoint interface entity. The endpoints are generally not illustrated in FIGS. 3 through 9. The endpoint are however, the mechanism by which the transformation chains interact with the physical world through storage, display, input, actuation, audio, text, or the like.

The general concept of the transformation chains has been described with respect to FIGS. 3 through 10 with respect to specific examples of transformation chains that have particular nodes and particular dependency elements. However, the principles described herein apply to any transformation chain having any number of nodes and any number of dependency elements, regardless of the function of the node and identity of the dependency element. Accordingly, the principles described herein may be applied to a limitless variety of transformation chains performing a limitless variety of functions. One or more endpoint interface entities have credentials to interface with the endpoints of a transformation chain instance or portions thereof. Such credentials may include credentials to provide input to some or all of the endpoints of one or more or all nodes of a transformation chain instance, credentials to receive output from some or all of the endpoints of one or more or all nodes of a transformation chain instance, or even the power to delegate credentialed power to one or more delegate endpoint interface entities.

Transformation Chain Supporting Architecture

In accordance with the principles described herein, an architecture is described in which transformation chains may be combined incrementally forming dynamically changing functions at runtime, thereby changing the concept of what an application is. With the benefit of reading this description, transformation chains are like molecules floating within an environment, and with the proper impetus, such molecules combine resulting in a compound that operates differently from its constituent parts. For instance, given the right impetus, two hydrogen molecules may combine with an oxygen atom to formulate a molecule of water. While liquid hydrogen and liquid oxygen cannot be consumed by humans, liquid water can and must be consumed by human beings. Thus, the principles described herein allow molecules of transformation chains to be joined dynamically and incrementally to formulate customized applications that provide customized functionality that is suitable to the impetus experienced. Such applications may be so customized that there may be times that a particular application is only constructed once.

The principles described herein also allow a delegator endpoint interface entity to delegate power to another delegate endpoint interface entity to interface with certain endpoints, without the delegator endpoint interface entity giving up control of how the delegate endpoint interface affects the transformation chain instance. Accordingly, the principles described herein also allow a transformation chain to be safely split.

Through atomic and molecular composition, a seemingly infinite variety of animate and inanimate objects, and entire worlds, have formed. Currently, there are only 115 known elements in the periodic table of the elements from which an infinite variety of animate and inanimate objects throughout the universe are composed. Using only a limited number of transformation chains, that may be combined in certain ways, there is a substantially limitless variety of applications of a substantially limitless variety of functions that may be generated in a universe of possible applications. Accordingly, the principles described herein describe a new organic paradigm in incrementally building application and sharing split applications to suit the very present circumstances. Furthermore, the principles described herein allow for the careful tracking of credentials of which endpoint interface entity may interact with which endpoint of which nodes of which transformation chains, and allows for temporary, or even permanent delegation of such credentials to other endpoint interface entities. Accordingly, a wide variety of collaboration scenarios are enabled in such an organic application environment.

Figure 11:
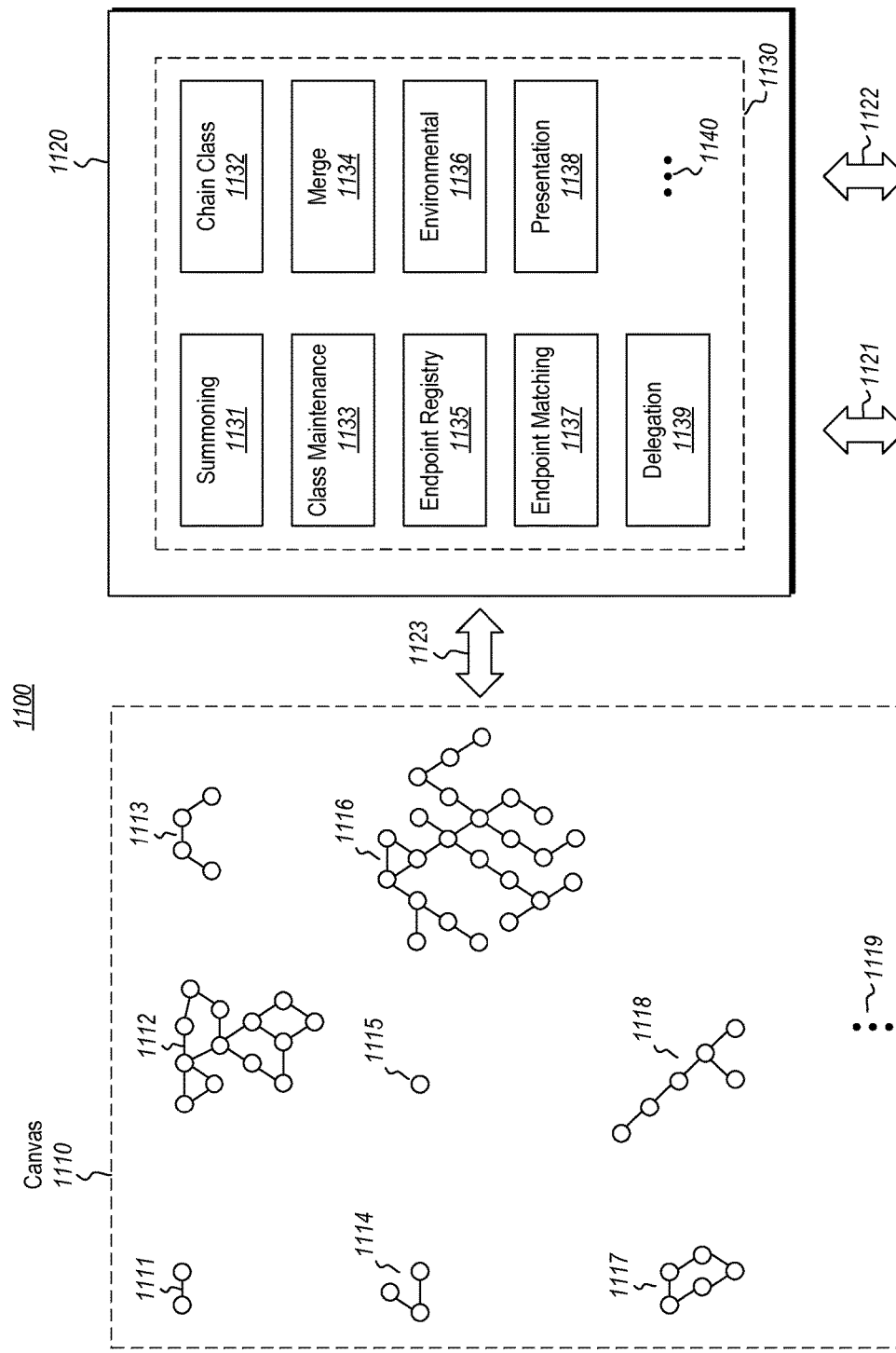
FIG. 11 illustrates a runtime architecture in which transformation chains may be implemented, and which includes a canvas referred to herein as a universal canvas.

FIG. 11 illustrates a runtime architecture 1100 in which this new paradigm in applications may be implemented. The runtime architecture 1100 includes a universal canvas 1110. The universal canvas 1110 represents the universe in which transformation chain instances are formed, combined, operated, and extinguished. As an example, the universal canvas 1110 is illustrated as operating eight transformation chains 1111 through 1118 of varying complexity. However, the ellipses 1119 represent that the universal canvas 1110 may run many transformation chain instances. Given sufficient resources, the universal canvas 1110 may even run millions or billions of application chain instances.

The runtime architecture also includes a supporting architecture 1120 that includes modules and components that operate outside of the observable universal canvas 1110, to ensure the appropriate formation, combination, sharing, operation, and extinguishing of the transformation chain instances. The supporting architecture 1120 itself can receive input and provide output at represented by bi-directional arrow 1121. The supporting architecture 1120 may also provide access to services as represented by bi-directional arrow 1122. The supporting architecture 1120 also interacts with the universal canvas 1110 as represented by the bi-directional arrow 1123 for purposes of instantiating transformation chains, combining transformation chain instances, altering transformation chain instances, enforcing credentialed use of the transformation chain instances by appropriate endpoint interface entities, extinguishing transformation chain instances, and the like.

The precise physical platform on which the universal canvas 1110 is run is not critical. In fact, there can be great flexibility and dynamic change in the physical platform on which the universal canvas 1110 is operated. Some nodes of some transformation chains may be operated by one physical platform (such as a device, endpoint interface entity, system, or cloud, while other nodes operate another physical platform). In one embodiment, the universal canvas 1110 operates in a cloud computing environment, such as a private cloud, a hybrid cloud, or a public cloud. As an example, the universal canvas may be within a local network, in a peer-to-peer computing network, in a cloud computing environment, in any other network configuration, or in any combination of the above. Even so, as previously mentioned, the universal canvas interfaces with the physical world through the endpoints of the various nodes of the transformation chain instances.

Likewise, the supporting architecture 1120 may be operated in any computing environment, in peer-to-peer computing network, in a local network, any other network configuration, or in any combination of these. In the case where the transformation chain instances within the universal canvas 1110 operate fully or primarily, or even party in a cloud computing environment, it may be this same cloud computing environment that operates the supporting architecture.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS").

The cloud computing model may also be deployed using different deployment models such as private cloud, community cloud, public cloud, hybrid cloud, and so forth. In this description and in the claims, a "cloud computing environment" is an environment in which cloud computing is employed.

The supporting environment 1120 includes a number of modules 1130. One of the modules 1130 is a summoning module 1131 that interprets input and in response determines that a class of a transformation chain is to be instantiated. For instance, the input may be received directly from input (from arrow 1121) to the supporting environment 1120 or via input from a transformation chain instance running in the universal canvas 1110 itself. Input that may be received from either source will be referred to herein as "general input". Summoning criteria are used for recognizing that certain general input is to result in a transformation chain instance being created. Summoning criteria may be also any environmental criteria at all. For instance, the summoning criteria may take into account not just verbal conversations, or explicit user input directed at a hardware entity, but may also take into consideration other environmental factors. For instance, whether a particular user is sitting down, moving away, looking somewhere, being near a device with a touch screen, and so forth, may also be environmental criteria used as summoning criteria for summoning an instance of a transformation chain class to be created within the universal canvas 1110.

The modules 1130 also includes a chain class module 1132 that instantiates transformation chain instances in response to determinations made by the summoning module 1131 and/or in response to general input.

The modules 1130 also includes a chain class maintenance module 1133 that maintains a copy of each transformation chain class. The chain class maintenance module 1133 may add to the library of available transformation chain classes in response to a determination made by the summonsing module 1131 and/or in response to general input. Thus, the chain class maintenance module may maintain a registry of transformation chain classes. For instance, the chain class maintenance module 1133 might merge classes along their appropriate points of dependency, or perhaps create a transformation chain class that represents a redacted or truncated version of a pre-existing transformation chain class. Some transformation chain classes may be created temporarily, whilst others may have more lasting persistence. Furthermore, authentication and authorization may be imposed so as to restrict which entities may instantiate transformation chains of certain classes.

A merging module 1134 merges instances of transformation chains to be operated in the universal canvas 1110 in an appropriate way given the dependencies of the transformation chains. Such merging occurs in response to determinations made by the summoning module 1131 and/or in response to other general input. The merging criteria may also be any general environment criteria. Again, the merging criteria may take into account not just verbal conversations, or explicit user input directed at a hardware entity, but may also take into consideration other environmental factors that are deemed appropriate for the merging to occur.

An endpoint interface entity registry module 1135 maintains a registry of all possible endpoint interface entities (hardware entities and potentially associated user criteria), as well as which endpoint interface entities are presently active and available given a particular instantiated transformation chain operating within the universal canvas 1110.

An environmental module 1136 detects when endpoint interface entities become active or inactive for a given instantiated transformation chain operating within the universal canvas 1110. For instance, the environmental module 1136 might detect when an initiating set of environment criteria for a hardware entity of a particular endpoint interface entity begin to be met resulting in the endpoint interface entity being available for the application (for interacting with the endpoints of the application). Likewise, the environment module 1136 might detect when a terminating set of one or more environmental criteria for the hardware entity of the particular entity is met resulting in the endpoint interface entity no longer being available for the application.

An endpoint matching module 1137 determines which active endpoint interface entities for an instantiated transformation chain are capable of and credentialed to provide input for each input endpoint of that transformation chain that is capable of receiving input from the physical world, and determining a proper form of the input given that endpoint interface entity. The endpoint matching module 1137 also determines which active endpoint interface entities for an instantiated transformation chain are capable of and credentialed to receive output for each output endpoint of the transformation chain that is capable of presenting output into the physical world.

The modules 1130 includes a presentation module 1138 that, when there are multiple eligible endpoint interface entities that are capable of providing input into an input endpoint, decides which endpoint interface entity is to provide that input, and potentially decides that multiple endpoint interface entities are capable of providing input into that input endpoint. Furthermore, when there are multiple eligible endpoint interface entities that are capable of rendering output from an output endpoint, the presentation module 1138 decides which endpoint interface entity is to provide that input, and potentially decides which of multiple endpoint interface entities are to render the output received from the output endpoint.

The presentation module 1138 also decides whether any restrictions are to be imposed when a particular endpoint interface module provides input to an input endpoint of a transformation chain. The presentation module 1138 may also decide whether there are any restrictions that are to be imposed when a particular endpoint interface module renders output from an output endpoint of a transformation chain. When that output is visualizations, the presentation module 1138 may decide how visualized information is to be formatted and/or laid out on the display of the endpoint interface entity.

The modules 1130 also includes a delegation module 1139 that allows and facilitates credentialed endpoint interface entity to delegate power to a delegee endpoint interface entity with respect to receiving output from or providing input to particular endpoints of a transformation chain instance. As such, delegation module 1139 facilitates splitting of transformation chain application, thereby allowing dynamic movement into and out of collaborative scenarios. There may be other modules within the modules 1130 as represented by the ellipses 1140.

Transformation Chain Operation

Having now described transformation chain applications, and an architecture that facilitates operation of transformation chain applications with respect to FIGS. 3 through 11, example operations of the transformation chains and the supporting architecture will now be described with respect to FIGS. 12 through 26. First, the dynamic building of transformation chain instances will be described.

The dynamic building of transformation chain instances will now be described. In accordance with the principles described herein, transformation chains may be combined incrementally and with ease of effort forming dynamically changing functions at runtime. Transformation chains are like molecules floating within an environment, and with the proper impetus, such molecules combine resulting in a compound that operates differently from its constituent parts. Thus, the principles described herein allow instances of transformation chains to be joined dynamically and incrementally to formulate customized applications that provide customized functionality that is suitable to the impetus experienced.

As a concrete example, suppose that there is a transformation chain that extracts received orders from a database. A verbal command to "show me my orders" by a sales representative might instantiate that transformation chain class, filter by the user that stated the verbal command, and visualize the filtered list or orders. A subsequent join instruction might be "Fetch me my customers", which might then cause another transformation chain to automatically join with the prior transformation chain to match customers with orders, and visualize the orders by customers. The user might then state "add order exceptions for customers" causing perhaps yet another transformation chain to join the existing transformation chain aggregation, and/or cause input to be made to an existing node of the current aggregation of transformation chains. At each stage, the user may determine based on the current state of the aggregated transformation chain what is lacking, and state or input further joining instructions, from which yet other transformation chains may be join in the growing customized application chain. In essence, the application is built as the user thinks and expresses intuitively what he or she wants, and the application is built in a manner that is sensitive to the environment.

Figure 12:
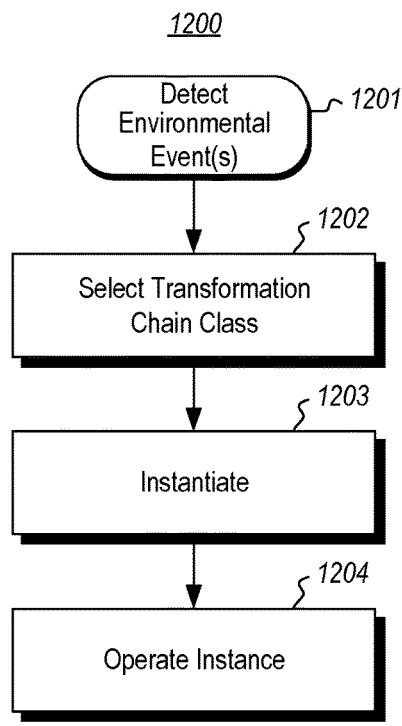
FIG. 12 illustrates a flowchart of a method for formulating an application in response to detecting events in an environment, which represents a simple case in which an instance of a transformation chain is created and operated within the universal canvas of FIG. 11.

FIG. 12 illustrates a flowchart of a method 1200 for formulating an application in response to detecting one or more environment events, which represents a simple case in which an instance of a transformation chain is created and operated within the universal canvas 1110. First, a set of one or more environmental events (e.g., the presence of a user) is detected (act 1201). For instance, the summoning module 1131 might detect one or more environmental events that are to trigger instantiation of a particular transformation chain class.

Responsive to the detected environment event(s), the transformation class corresponding to the input is selected (act 1202). For instance, the summoning module 1131 or the chain class module 1132 may select which of the available transformation chain classes (maintained by the chain class maintenance module 1123) corresponds to the detected environmental event(s).

An instance of the transformation chain class is then created (act 1203). For instance, the chain class module 1132 might instantiate an instance of the identified transformation chain class. When instantiating the transformation chain class, the endpoint interface entity matching module 1137 may provide appropriate credentials to one or more appropriate endpoint interface entities so that such entities are credentialed to receive output from and/or provide input to one or more endpoints of the transformation chain instance.

Optionally, the instance may then be operated (act 1204). For instance, in FIG. 11, the instance of the transformation chain class may be deployed and operated within the universal canvas 1110.

As part of this operation (act 1204), the environmental module 1136 detects which of the registered endpoint interface entities are active for the given instantiated transformation chain. Furthermore, the endpoint interface entity matching module 1137 determines which active endpoint interface entity endpoints for the instantiated transformation chain should provide input for each endpoint of each node of the transformation chain that is capable of receiving input from the physical world, and what forms of input are acceptable. Furthermore, the endpoint interface entity matching module 1137 determines which active endpoint interface entities for the instantiated transformation chain should receive output for each output endpoint of each node of the transformation chain that is capable of realizing (e.g., visualizing, rendering, sounding, storing, actuating, and the like) output into the physical world, and what forms of output are acceptable.

Figure 13:
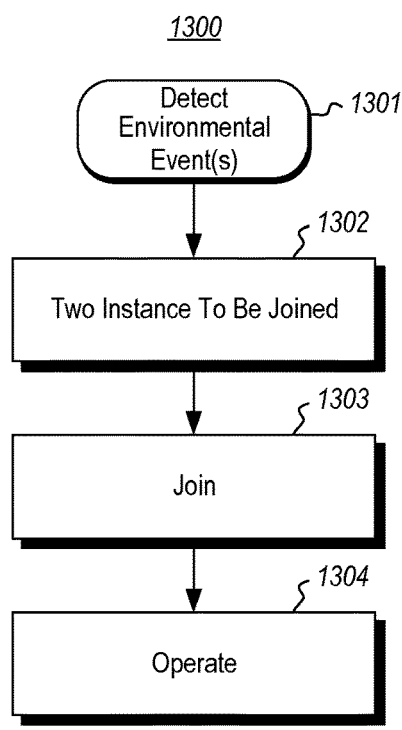
FIG. 13 illustrates a flowchart of a method for responding to detecting events in the environment by combining transformation chain instances.

At some point, further environmental event(s) are detected (such as user input) which directs that an instance of another transformation chain class is to be combined with an existing transformation chain instance. Accordingly, FIG. 13 illustrates a flowchart of a method 1300 for responding to further detected environment event(s) to thereby combine transformation chain instances. The method 1300 is initiated by detecting further environmental event(s) (act 1301) that is constituent with combination of two instances of transformation classes.

As an example, a transformation chain instance may be combined with the instance created in method 1200, or perhaps may be combined with an instance of a transformation chain created by a previous performance of the method 1300 of FIG. 13. Although not required, the instance to which the transformation chain instance is to be joined may have previously operated as an application already. Thus, the method 1300 may be repeatedly performed in order to build a sophisticated and customized transformation chain in response to various detected environmental events.

The detected environment events of act 1301 may be an expressed instruction to join. For instance, the user might have a user interface that allows explicit selection of a desired application chain class to be instantiated. Alternatively, the detected environment events of act 1301 may simply be an implicit indication that two transformation chain instances should be joined. For instance, the detected environment events might be any activity, such as particular speech, that is consistent with the joining of two instances of different transformation chain classes. Such input could include gestures, requests, and the like. For instance, as previously mentioned, a sales representative might state "fetch me my customers" in the context of the representatives corresponding orders already being visualized. The system may even guess at what transformation chain the user might want based on history and current context. In that case, the user establishing the current context could be the environmental event(s) that cause the new transformation chain to be instantiated that the system guesses may be desired at some future point. For instance, perhaps the system knows that when in a particular conversation the users keep talking about a particular order, the system might join transformation chain instances used to acquire that order in anticipation of showing that order. Whatever form the joining environment event(s) takes, the summoning module 1131 of FIG. 11 detects appropriate environmental event(s) that corresponds to the instantiation of a transformation chain class (as described with respect to FIG. 12) or the joining of two transformation instances (as will be described with respect to FIG. 13).

The method 1300 then includes determining, from the further detected environmental event(s), that an instance of one transformation chain class is to be joined with an instance of another transformation chain class (act 1302). For instance, as described above, there are class-level restrictions in which the transformation chain class author expressly makes it possible, at least under some conditions, for instances of two transformation chain classes to be joined. For instance, the dependency elements of FIGS. 6A through 8C are an example of such class-level restrictions and authorizations.

However, there may also be instance-level authorization. As an example, the act 1202 may involve consulting a set of one or more rules defining one or more conditions for joining an instance of the first transformation chain class and the second transformation chain class. This set of rules may be dynamic and change over time. For instance, the joining logic may learn over time that certain gestures or other user activity is, or is not, indicative of a user intent or anticipated future user intent to combine such instances. Accordingly, the supporting architecture may observe a history associated with each of multiple users in order to, over time, more accurately predict user intention, depending on a history of a particular user, or group of users, and thereby formulate an appropriate set of summoning and merging criteria. The act 1302 may be performed by, for instance, by the chain class module 1132 with reference to the transformation chain classes known to the class maintenance module 1133. The endpoint interface entity matching module 1137 may reevaluate which endpoint interface entities have credentials to interface with which endpoints of the composite aggregated transformation chain instance.

The author of a transformation chain class might also express restrictions at the granularity of a single dependency. For instance, in the dependence element 601B of transformation chain class 600A, the author might express that joining is authorized on that dependency element only if the transformation chain into which it is joined does not include an identified transformation chain class authored by a competitor. The author might also control data that is flowed out of the transformation chain to another joined transformation chain by writing restrictions or conditions into the transformation that would bridge the dependency itself (e.g., between nodes 601A and dependency element 601B).

However, even though transformation chain classes may interoperate, that does not mean that the user wants their particular instance of that transformation chain class to join with other instances of other transformation chain classes. After all, the data itself (e.g., the instance state) might be sensitive to the user. Accordingly, the method also may include determining that instances of different transformation chain classes are to be joined.

The joining criteria for authorizing two instance of different transformation chain classes to join may include one or more of the following: whether or not the user is on a meeting attendee list, a relationship (e.g., family, social network friend, or the like) of users of the various devices, a communication capability (e.g., near field) between the devices, a proximity of the respective devices (e.g., in the same conference room), the request of the users, of the like. For instance, the joining criteria might include some business criteria such as the associated users of the instances are on the same team. As another example, one device might be a kiosk in a retail space or hotel, where a customer uses the kiosk and a shop assistant or concierge can automatically use their device to join their transformation chain with that of the kiosk to thereby interact with the customer using the compound application. Conditions may be applied to the joining criteria. For instance, a bellhop's device might be able to join a customer's application if the concierge is not around (perhaps detected by the concierge not actively using the pairable application to join with that of customers, or being off network).

In some embodiments, the first transformation chain class used to instantiate the first of the two instances to be joined may be derived from an existing transformation chain class. As an example, the first transformation chain class may be the same as the first transformation chain class, except with one or more nodes of the transformation chain removed.

In response to the act of determining that the two instances are to be joined (act 1302), the two instances are joined (act 1303), so as to establish connections across one or more flow dependencies of the instance, thereby creating new avenues for data flow, and new application functionality. For instance, this joining may be accomplished by the merging module 1134. The joined instance may thereafter be operated (act 1304).

Figure 14A:
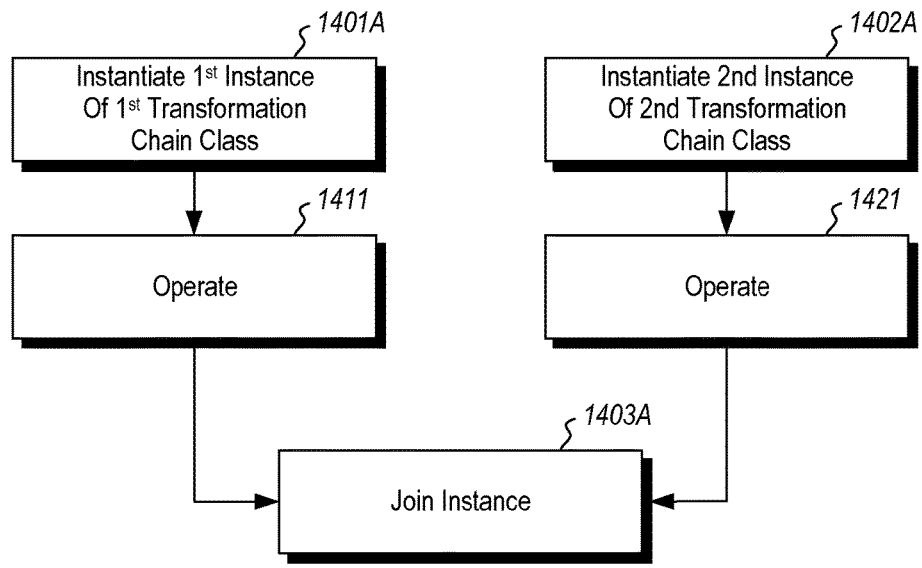
FIG. 14A illustrates a flowchart of a method for formulating an integrated instance of two transformation chain classes by first instantiating instances of each class, and then joining the instances.

In one embodiment, the instances themselves are directed joined without defining any new combined transformation chain classes. For instance, FIG. 14A illustrates a flowchart of a method 1400A for joining two instances and represents an example of the act 1303 of FIG. 13. The first instance of the first transformation chain class is instantiated (act 1401A) and perhaps operated (act 1411). Furthermore, the second instance of the second transformation chain class is instantiated (act 1402A) and perhaps operated (act 1421). Thereafter, the two instances are joined (act 1403A).

Figure 14B:
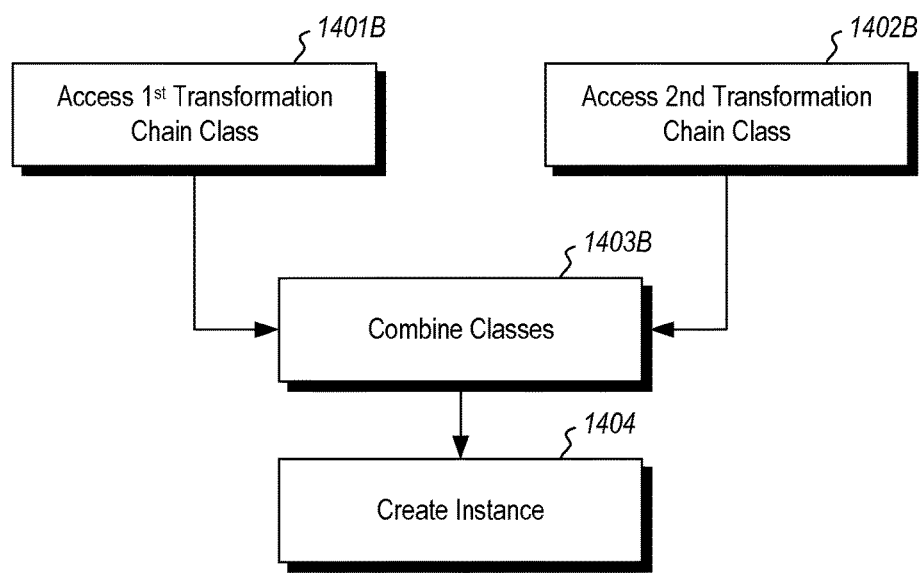
FIG. 14B illustrates a flowchart of a method for formulating an integrated instance of two transformation chain classes by first combining the two transformation chain classes, and then instantiating from the combined transformation chain class.

In other embodiments, the transformation chain classes themselves are aggregated to define a new combined class, and an instance of that aggregated class is instantiated to thereby accomplish act 1303. The combined instance may exist temporarily, may be kept for the benefit of a limited number of one or more users, or may even be added to the library of transformation chain classes that are available for more widespread use. For instance, FIG. 14B illustrates a flowchart of a method 1400B that represents another example of the act 1303 of FIG. 13. The first transformation chain class is accessed (act 1401B) and the second transformation chain class is accessed (act 1402B). The two classes are then combined (act 1403B). An instance is then created from the combined transformation chain class (act 1404).

As an example only, perhaps method 1200 or act 1401A of method 1400A might be employed to create an instance of a transformation chain of FIG. 6A. Now suppose that environmental event(s) are detected that suggest combination of instances of transformation chains of FIGS. 6A and 6B. Method 1300 may then be performed to create the instance of the transformation chain of FIG. 7A. In that case, act 1401A of method 1400 would instantiate from the transformation chain class of FIG. 6A, and act 1402A of method 1400 would instantiate from the transformation chain class of FIG. 6B. The result may be thought of as an instantiation of the aggregated class of the classes of FIGS. 6A and 6B (which is represented in FIG. 7A).

Now suppose that environmental event(s) are detected that suggest combination of instances of transformation chains of FIGS. 7A and 6C. The method 1300 may then be performed to create the instance of the transformation chain of FIG. 7A. In that case, act 1401A of method 1400A would be used to instantiate (in which the result from the prior performance of the method to create the transformation chain instance of FIG. 7A could be viewed as instantiating from the aggregated classes of FIGS. 6A and 6B) an instance of FIG. 7A. Furthermore, act 1401B of method 1400 would be used instantiate from the transformation chain class of FIG. 6C. The result may be thought of as an instantiation of the aggregated class of the classes of FIGS. 7A and 6C (which is represented in FIG. 8A).

Now suppose that environmental events are detected that suggests combination of instances of transformation chains of FIGS. 8A and 6D. The method 1300 may then be performed to create the instance of the transformation chain of FIG. 8A. In that case, act 1401A of method 1400A would be used to instantiate an instance of FIG. 8A. Furthermore, act 1401B of method 1400 would be used instantiate from the transformation chain class of FIG. 6D. The result may be thought of as an instantiation of the aggregated class of the classes of FIGS. 8A and 6D (which is represented in FIG. 9).

Having now described the general principles of transformation chains, the environment in which they may operate, and their principles of aggregation, this description will now address how a delegator endpoint interface entity having credentials on a transformation chain instance may delegate power to a delegee endpoint interface entity to receive output from particular endpoint(s) and/or provided input to particular endpoint(s). Accordingly, application splitting and sharing is made possible in this organic universal canvas of transformation chain instances.

Figure 15A:
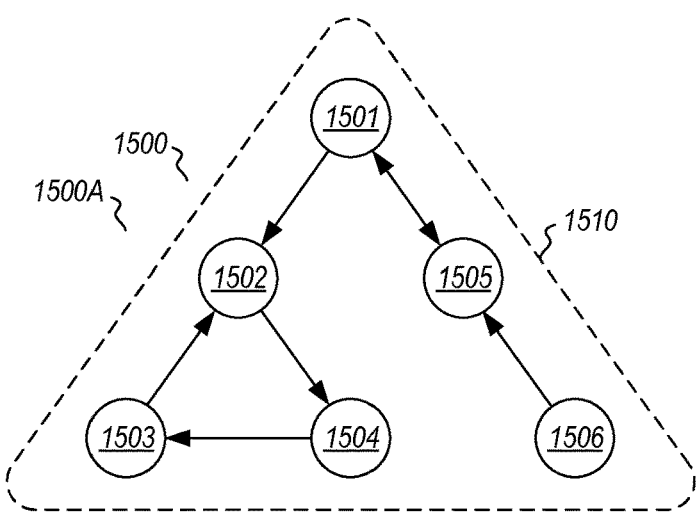
FIG. 15A illustrates a transformation chain instance that is preparing to be split.

FIG. 15A illustrates an example transformation chain 1500 in a state 1500A in which it is about to be split. FIG. 16 illustrates a flowchart of a method 1600 for formulating a split application. As the method 1600 may be performed in the context of the example transformation chains 1500A and 1500B of FIGS. 15A and 15B, respectively, the method 1600 of FIG. 16 will be described with frequent reference to the example transformation chains 1500A and 1500B.

As illustrated in FIG. 15A, the example transformation chain 1500A includes six nodes 1501 through 1506. Each of the nodes may have zero or more input endpoints and zero or more output endpoints. However, to keep the diagram cleaner, the endpoints are not illustrated for the example transformation chain 1500A of FIG. 15A. Likewise, the endpoints are not illustrated for the example transformation chain 1500B in FIG. 15B.

In the initial state 1500A of FIG. 15A, a particular endpoint interface entity (referred to herein as a "first endpoint interface entity") is credentialed to provide input to and receive output from endpoints of transformation chain 1500A. The scope of this credential is represented by the dashed lined boundary 1510.

Now suppose that the application represented by the transformation chain 1500A is to be split. That is, suppose that the first endpoint interface entity provides interaction or input suggesting that a transformation chain instance representing a portion of the larger transformation chain instance 1500A is to be created. There may be several reasons for performing such a split. One reason might be simply because the first endpoint interface entity is to use another instance of just that portion of the larger transformation chain class. Another reason might be to delegate input and/or output privileges associated with one, some, or all of the endpoints of those nodes that are part of the portion to another endpoint interface entity. In other words, the first endpoint interface entity assigns the portion of the transformation chain, at least temporarily, to the second endpoint interface entity. A redaction and share gesture may be used to express this intent to delegate. For instance, a user might cross over a certain portion of the user interface (indicating that the target endpoint interface entity is not to have the ability to view or input into those fields), and then indicate a share gesture.

In any case, interaction and/or environmental event(s) are detected that are representative of splitting an instance of a smaller class off of the larger transformation chain class (act 1601), thereby initiating the method 1600 of FIG. 16. Based on the detected environment event(s), the system determines that a portion transformation chain class is to be created (act 1602) that represents a portion of the larger transformation chain class. This determination might be made by, for instance, the delegation module 1139 of FIG. 11. For instance, referring to FIG. 15A, suppose that a portion transformation chain class is to be created that is represented only by nodes 1505 and 1506. In response, an instance of the portion transformation chain class is instantiated (act 1603) and operated (act 1604). For instance, the second endpoint interface entity may be instructed (by the first endpoint interface entity and/or by the delegation module 1139) to interact with the endpoints of the instantiated portion transformation chain class. The instantiated portion transformation chain class may be sent to the second endpoint interface entity.

Figure 15B:
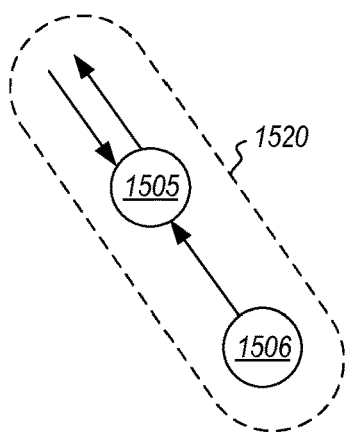
FIG. 15B illustrates a transformation chain instance that is split from the transformation chain instance of FIG. 15A.
Figure 16:
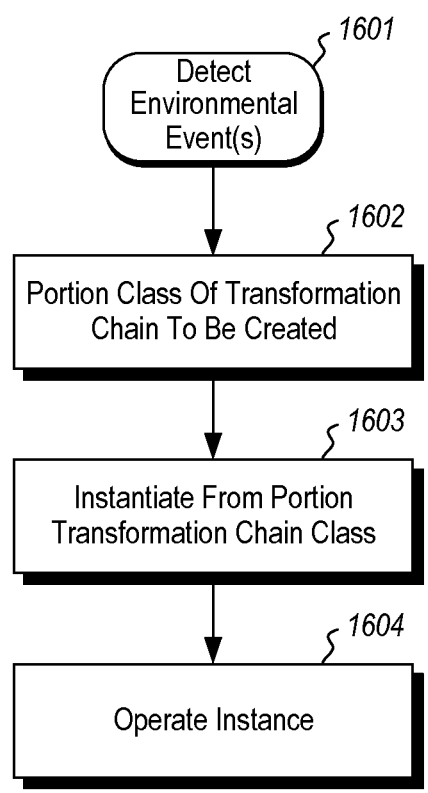
FIG. 16 illustrates a flowchart of a method for formulating a split application.

FIG. 15B represents the portion resulting transformation chain 1500B that includes just the node 1505 and the node 1506. A dotted lined border 1520 is illustrated to represent that a particular endpoint interface entity may have credentials to interface with some or all of the endpoints of the nodes 1505 and 1506. In one embodiment, the splitting is not made for purposes of delegation, and the first endpoint interface entity also has credentials to interface with the endpoints of nodes 1505 and 1506 in the new portion transformation chain 1500B. However, a very useful scenario is that the first endpoint interface entity has delegated privileges to a second endpoint interface entity to interface with at least some endpoints of the nodes 1505 and 1506 of the portion transformation chain 1500B.

FIG. 17A through 17D illustrate several possible embodiments of how such delegation might occur from the perspective of the portion transformation chain 1500B. In the symbolism of FIGS. 17A through 17D, a node represented by dashed lined borders represents a node of which only some of the endpoints of the original node are available for interfacing with the second endpoint interface entity.

Figure 17A:
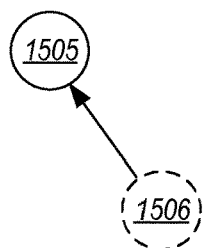
FIGS. 17A through 17D illustrates various possible configurations for the split transformation chain instance of FIG. 15B.

In the embodiment 1700A of FIG. 17A, the node 1505 is illustrated with as a solid circle, representing that all endpoints of the node 1505 have been instantiated and made available to the second endpoint interface entity. Meanwhile, the node 1506 is illustrated with a dashed-lined circle, representing that only a portion of the endpoints of the node 1506 have been instantiated and made available to the second endpoint interface entity.

Figure 17B:
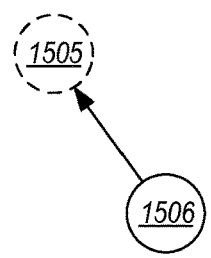

In the embodiment 1700B of FIG. 17B, the node 1506 is illustrated with as a solid circle, representing that all endpoints of the node 1506 have been instantiated and made available to the second endpoint interface entity. Meanwhile, the node 1505 is illustrated with a dashed-lined circle, representing that only a portion of the endpoints of the node 1505 have been instantiated and made available to the second endpoint interface entity.

Figure 17C:
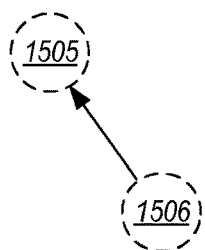

In the embodiment 1700C of FIG. 17C, the nodes 1505 and 1506 are both illustrated with a dashed-lined circle, representing that only a portion of the endpoints of each of the nodes 1505 and 1506 have been instantiated and made available to the second endpoint interface entity.

Figure 17D:
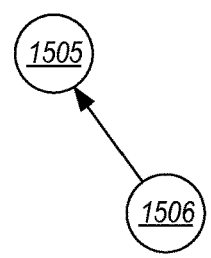

In the embodiment 1700D of FIG. 17D, the nodes 1505 and 1506 are both illustrated as a solid circuit, representing that all of the endpoints of each of the nodes 1505 and 1506 have been instantiated and made available to the second endpoint interface entity.

Note that there need be no change to the instance of the transformation chain 1500 that is in state 1500A from the perspective of the first endpoint interface entity. In that case, whatever endpoints are created for nodes 1505 and 1506 for the second endpoint interface entity may simply be cloned endpoints. During operation, if a cloned input endpoint received inconsistent input from both the first endpoint interface entity and the second interface entity, merging criteria may resolve the inconsistency. For instance, perhaps inconsistencies are resolved in favor of the delegating endpoint interface entity. Merging operations may be provided by, for instance, the delegation module 1139 of FIG. 11.

In an alternative embodiment, a remainder instance may be created that represents a logical remainder when the portion instance 1500B is subtracted from the larger instance 1500A, and thus no endpoint are cloned at all. For instance, in the case of FIG. 17D, in which the second endpoint interface entity is given access to all endpoints of the nodes 1505 and 1505, a remainder instance may be created with just the nodes 1501 through 1504. In the case of FIG. 17A, the remainder instance might include nodes 1501 through 1504 and a limited form of node and 1506 with only the endpoints that were not included with the node 1506 of the remainder instance being included in the portion instance 1700A. In the case of FIG. 17B, the remainder instance might include nodes 1501 through 1504, and a limited form of node 1505 with only the endpoints that were not included with the node 1505 of the remainder instance being included within the portion instance 1700B. In the case of FIG. 17C, the remainder instance might include nodes 1501 through 1504, and a limited form of node 1505 and 1506 with only the endpoints that were not included with the nodes 1505 and 1506 of the remainder instance being included within the portion instance 1700B.

In operation, the delegation module 1139 may allow the first endpoint interface entity to maintain control or supervision over the actions of the second endpoint interface entity in interacting with the portion 1500B of the transformation chain 1500A. For instance, the second endpoint interface entity may be credentialed through the first endpoint interface with respect to the portion 1500B such that data flows to and from the instance of the portion transformation class 1500B are approved by and/or channeled through the remainder of the transformation chain 1500A controlled by the first endpoint interface entity. Furthermore, the access of the second endpoint interface entity to data (such as a data service) is strictly controlled. Data for nodes that are not within the portion transformation chain class are provided via the approval of the first endpoint interface entity.

Figure 18:
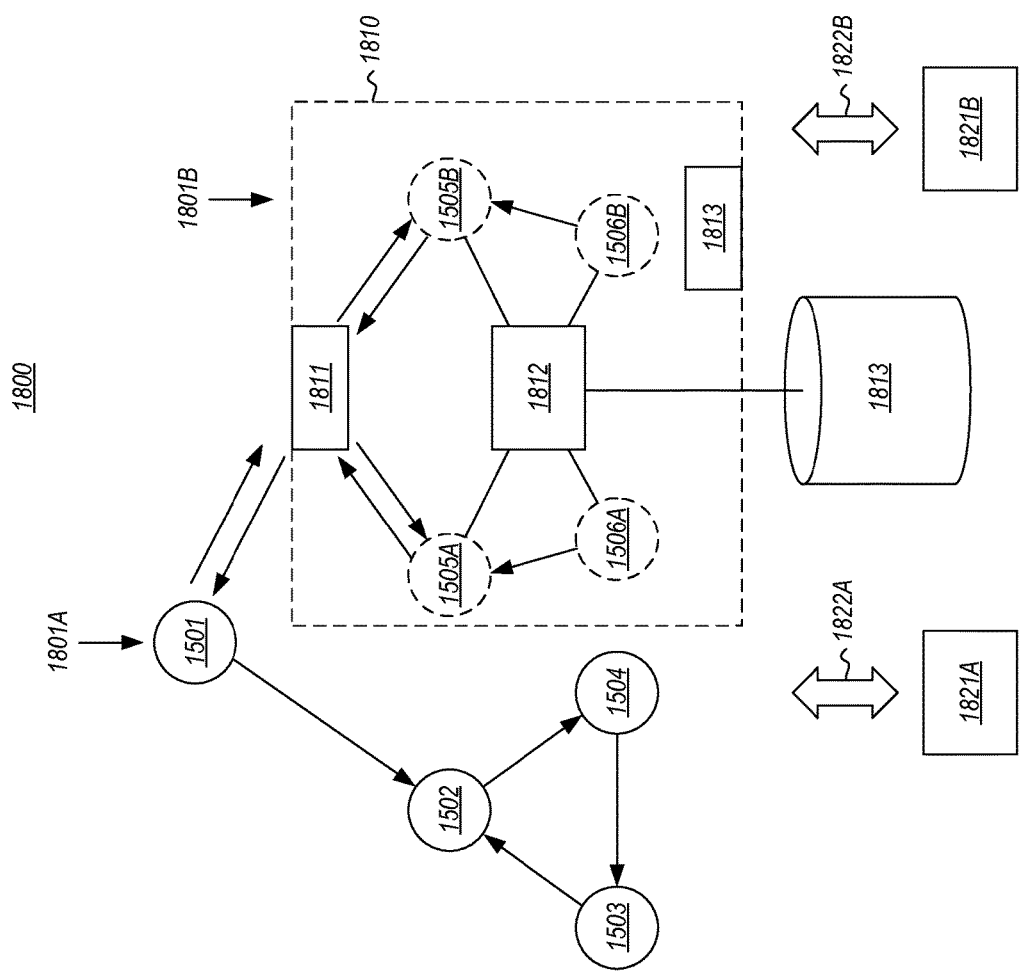
FIG. 18 illustrates an architecture in which a larger transformation chain instance that is assigned to a first endpoint interface securely interfaces with a portion transformation chain instance that is assigned to a second endpoint interface via a proxy service.

FIG. 18 illustrates an architecture 1800 in which the larger transformation chain instance 1801A that is assigned to a first endpoint interface 1821A securely interfaces with apportion transformation chain instance 1801B that is assigned to a second endpoint interface 1821B via a proxy service 1810.

The larger transformation chain instance 1801A is similar to the transformation chain 1500A of FIG. 15A, except that the first endpoint interface entity 1821A may access only a portion of the endpoints of the node 1505 (now referred to as node 1505A since it now has more limited interfacing capability with the first endpoint interface entity 1821A) and node 1506 (now referred to as node 1506A since it now has more limited interface capability with the first endpoint interface entity 1821A). The ability of the first endpoint interface entity 1821A to interface with the larger transformation chain instance 1801A is represented by bi-directional arrow 1822A.

The portion transformation chain instance 1801B is similar to the portion transformation chain 1500B of FIG. 15B, except that (similar to the case of FIG. 17C) the second endpoint interface entity 1821B may access only a portion of the endpoints of the node 1505 (now referred to as node 1505B since it now has more limited interfacing capability with the second endpoint interface entity 1821B) and node 1506 (now referred to as node 1506B since it now has more limited interface capability with the second endpoint interface entity 1821B). The ability of the second endpoint interface entity 1821B to interface with the portion transformation chain instance 1801B is represented by bi-directional arrow 1822B.

The proxy service 1810 provides a point of abstraction whereby the second endpoint interface entity 1821B may not see or interact with the nodes 1501 through 1504 of the larger transformation chain instance 1801A, nor may the second endpoint interface entity 1821B interface with any of the endpoints of the nodes 1505 and 1506 that are assigned to the first endpoint interface entity 1821A. As an example, the proxy service 1810 may be established by the delegation module 1139 of FIG. 11 at the time that a portion of transformation chain instance is assigned to another endpoint interface instances.

The proxy service 1810 keeps track of which endpoints on node 1505 are assigned to each node 1505A and 1505B, and which endpoints on node 1506 are assigned to each node 1506A and 1506B. When the proxy service 1810 receives input transformations from the larger transformation chain (e.g., node 1501), the proxy service 1810 directs the transformation to each of the nodes 1505A and 1505B as appropriate, depending on which values are affected by the input transformations. Furthermore, when output transformations are provided by the nodes 1505A and 1505B to the node 1501, the proxy service 1810 merges the outputs and provides the merged transformations to the node 1501. For the perspective of the node 1501, it is as though the node 1501 is interacting with node 1505, just as the node 1501 did prior to application splitting. Accordingly, performance and function are preserved, while enabling secure application splitting, by maintaining appropriate information separation between the first and second endpoint interface entities 1821A and 1821B. Such merging of output transformations and splitting of input transformations are performed by component 1811 of the proxy service 1810.

The proxy service 1810 may also include a recording module 1820 that evaluates inputs and outputs made to endpoints in each of the nodes 1505A, 1505B, 1506A and 1506B, and records such inputs and outputs. The recording module 1812 also may record the resulting transformations made between nodes. Such recordings are made into a store 1813. A replay module 1813 allows the actions to be replayed. That may be particular useful if the portion transformation chain is assigned to another (i.e., a third) endpoint interface entity later on and a user of that third endpoint interface entity wants to see what was done. That third endpoint interface may come up to speed with what happened during the tenure of the second endpoint interface entity with the portion transformation chain. Another reason to replay might be to check, and approve, commit, or ratify some action. For instance, imagine an order editing scenario where a number of users are seeking to postpone or move back some deliveries. A first user might ask a second user to help with this. However, the first user does not want the second user to edit the order in a way that causes permanent side effects (e.g., some shipping slot gets released and some now slot gets booked due to a service call). The first user might want to replay what the second user did, and if the first user like was she sees, then accept and commit the actions taken. Here, the replay mechanism additionally simulates the side effecting service calls for the second users. Then, on replay, the first user may cause those service calls to be bound to the actual services. The proxy service 1810 further ensures that the limited credentials of the second endpoint interface entity are enforced. For instance, endpoints on the nodes 1505B and 1506B may not receive proprietary data owned by the first endpoint interface entity from a service, and likewise may not change such proprietary data, at least not without the consent of the first endpoint interface entity.

The splitting of transformation chain instances as described herein allows for a wide variety of scenarios. For instance, by only allowing output endpoints to be cloned in the portion transformation chain provided to the second endpoint interface entity, and retaining input and output endpoints with the first endpoint interface entity, the second endpoint interface entity may have a shared view on what the first endpoint interface entity is doing. Of course, the first endpoint interface entity may restrict which output endpoints are provided in the portion transformation chain, and thus such view sharing can even be restricted. Furthermore, collaborative and co-use scenarios are enabled by dividing input endpoints between the first and second endpoint interface entities. Several instances and versions of a portion transformation chain may be split off of the main transformation chain to allow such scenarios across more than two endpoint interface entities. Each split may have an associated proxy service that maintains proper information separation and functioning of the transformation chain.

Figure 19A:
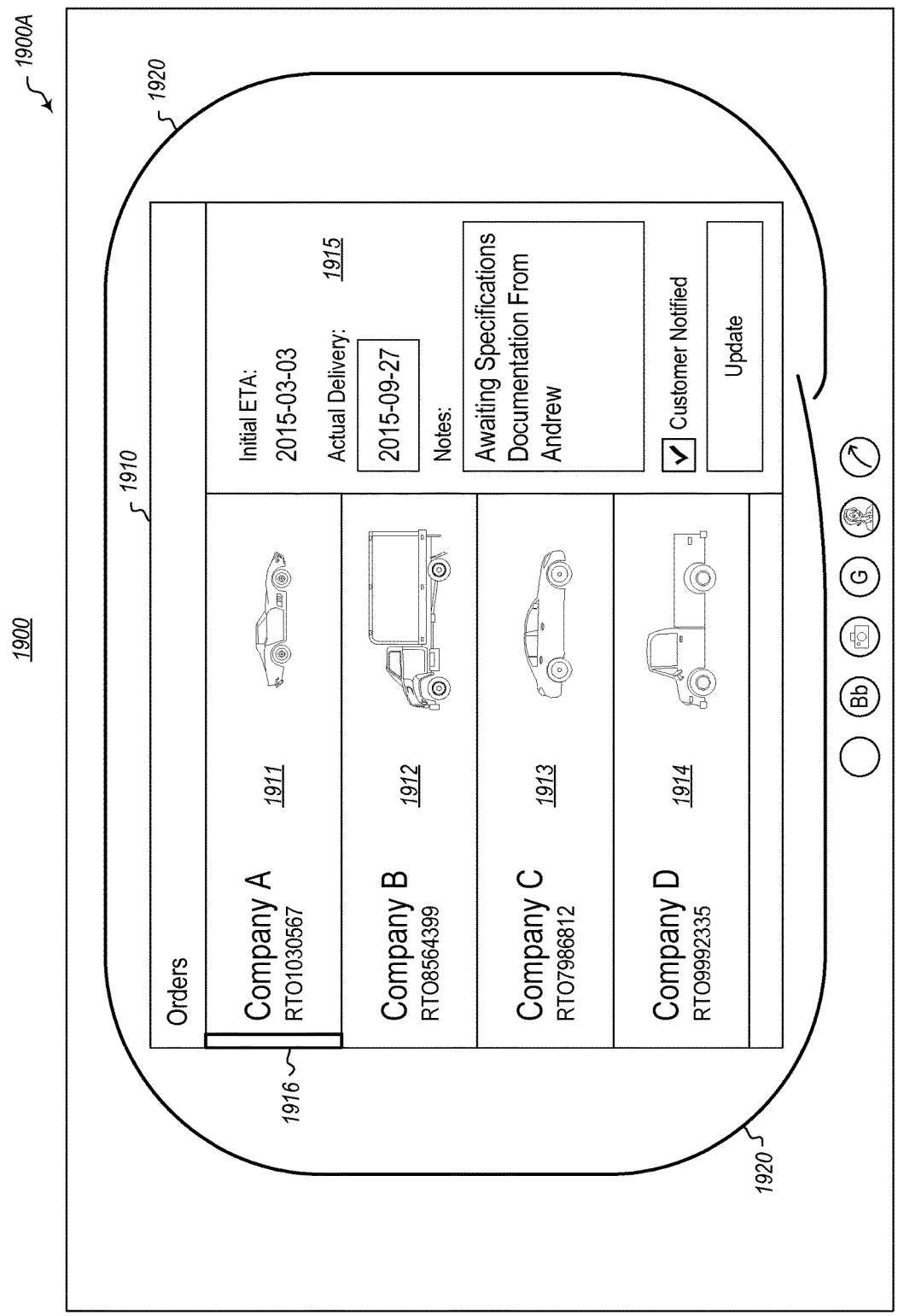
FIGS. 19A through 19C illustrate a sequence of user interfaces associated with the splitting of an application and redacting in order to perform the same.
Figure 19B:
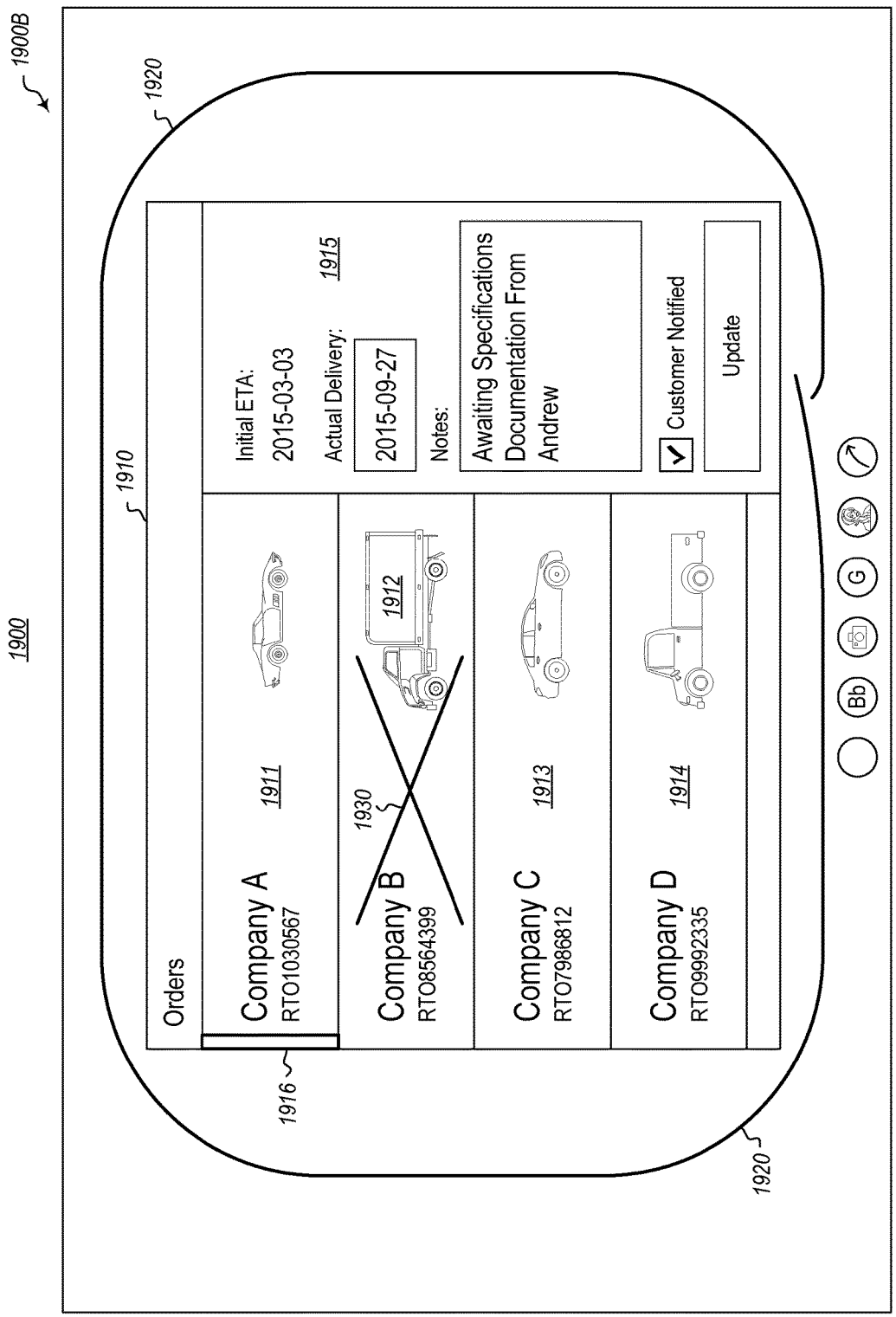
Figure 19C:
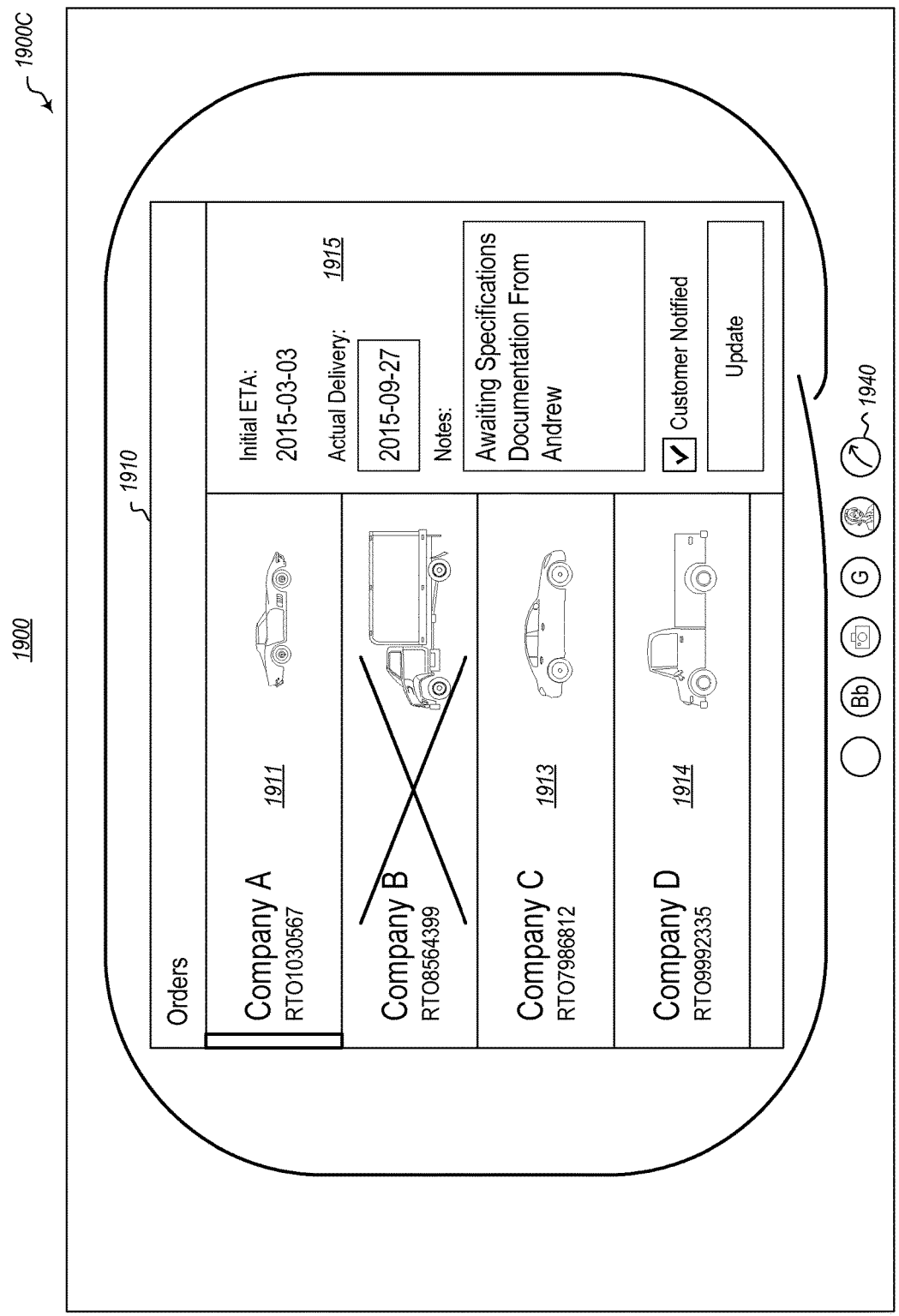

FIGS. 19A through 19C illustrate a specific example of the progress of a user interface 1900 through respective states 1900A through 1900C respectively, and shows how application splitting, delegation, and redaction can occur in one of an infinite variety of scenarios enabled by the broader principles described herein. The user interface state 1900A shows an object 1910 being displayed. The object is an "orders object" and represents only a portion of the total user interface that the underlying application (e.g., a transformation chain) is able to provide. The order object 1910 includes an enumeration of four order fields 1911 through 1914. Each order field includes a name of the order, a picture of the item ordered, and a purchase order number. The user may interact (and example of an environmental event) with the object 1910 by selecting one of the orders, causing properties of the order to appear in a details field 1915. In FIG. 19A, the field 1911 is selected (as represented by the think vertical bar 1916), representing that the details field 1915 includes details about that order. In this example, the order object may correspond to a node in a transformation chain, with visualizations of the order object being output endpoints of that node, and points of input capability being input endpoints of that node.

Now suppose that the user provides a selection user interaction with respect to the user interface 1900, or more specifically provides a selection user interaction with respect to the orders object 1910. Such selection user interaction might include a gesture. For instance, in the state 1900A, the user has circled (with gesture 1920) the orders object 1910. This results in selection of the orders object.

In FIG. 19B, a subsequent state 1900B is shown in which the user has provided a redaction user interaction with respect to the user interface, or more specifically with respect to a subportion of the selected portion. In this example, the user has redacted field 1912, by entering a cross-out gesture with respect to the user interface corresponding to that subportion (i.e., by crossing-out field 1912).

In FIG. 19C, a subsequent state 1900C is shown in which the user has selected a target for sharing the selecting portion (minus the redacted subportion), and has initiated sharing with that target portion. In particular, the user has interacted with element 1940, causing sharing to occur of the order object 1910 with the field 1912 redacted. Such is an example of one of an enumerable variety of sharing that may be accomplished using the principles described herein.

Figure 20:
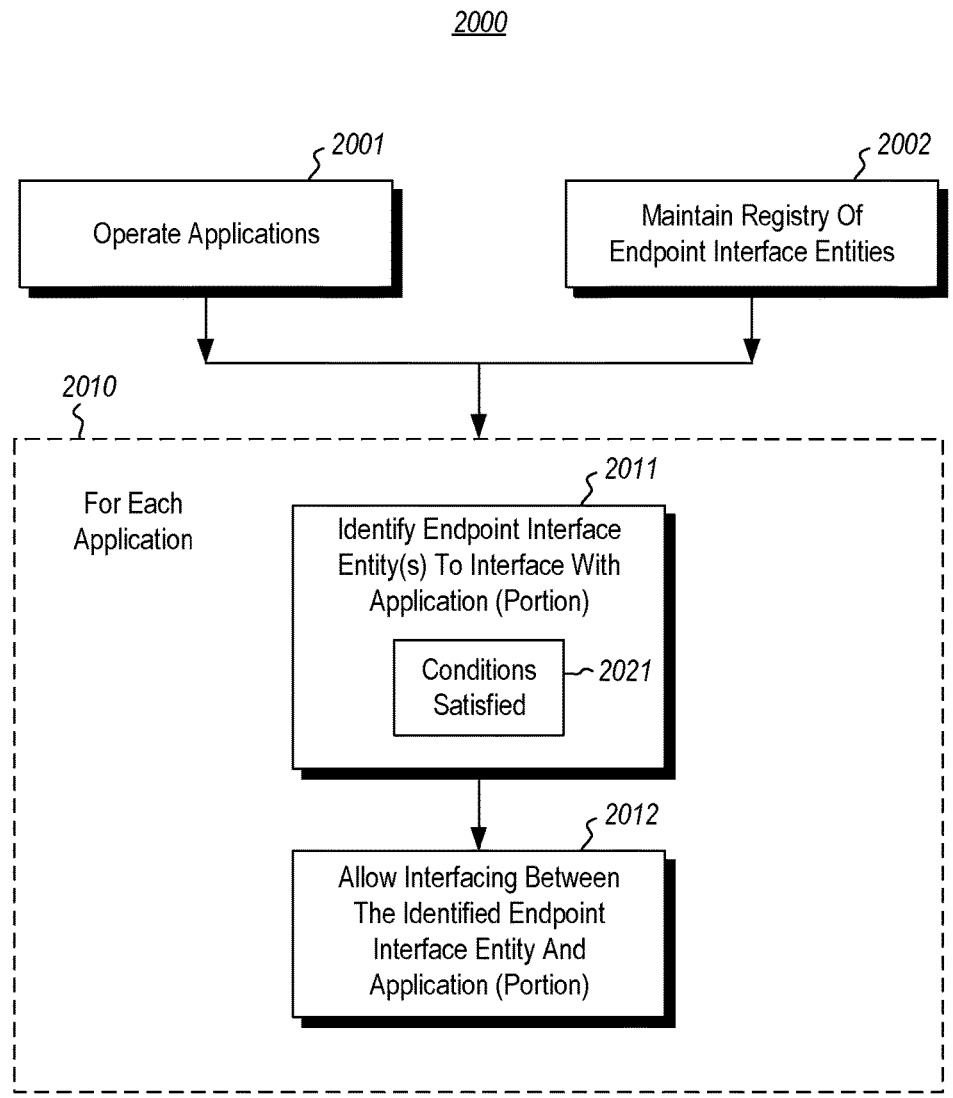
FIG. 20 illustrates a flowchart of a method for sharing an application in response to detecting one or more events at a first endpoint interface entity.

FIG. 20 illustrates a flowchart of a method 2000 for sharing an application in response to user input or other environmental event(s) at a first endpoint interface entity. The method is performed in the context of there being multiple applications operating (act 2001). For instance, in FIG. 11, there are multiple applications in the form of transformation chains operating within the universal canvas 1110. Furthermore, a registry of multiple endpoint interface entities is kept (act 2002). In FIG. 11, for example, this registry may be maintained by the endpoint interface entity registry module 1135. Recall that an endpoint interface entity may be a hardware entity and perhaps include associated user criteria defining a user status with respect to that hardware entity. Perhaps a single user may satisfy the user criteria with respect to multiple of the registered endpoint interface entities For each of the applications, the content of box 2010 is performed. Specifically, at least one endpoint interface entity selected from the endpoint interface registry is identified (act 2011) as to interface with the application (or a portion thereof). This selection may include determining that the identified endpoint interface entity is credentialed to interface (or correspond) with the application (or the portion thereof). As part of this identification, it is determined that the environmental event(s) (if any) are satisfied with respect to the endpoint interface entity (act 2021). For instance, in FIG. 11, this identification may be made by the endpoint matching module 1137.

The identified endpoint interface entity is then allowed (act 2012) to interface with the application (or the portion thereof). In other words, within the scope of the application (or the portion thereof), the identified endpoint interface entity is permitted to interface with the corresponding application endpoints within that scope. In the case of a split application, in which different endpoint interface entities are to interface with different portions of the application, the delegation module 1139 operates as described above.

In the event that there are multiple endpoint interface entities that are available for a given application, the identification of an appropriate endpoint interface entity (act 2011) might also include determining that 1) an output endpoint for rendering at the hardware entity of the identified endpoint interface entity is efficiently perceivable to at least one (a plurality of) user that satisfies(y) the user criteria of the identified endpoint interface entity, or has some specific characteristic helpful or required to complete a portion of a user's task intent or delivery the appropriate action in response to some implicit event in the environment, and 2) does not conflict with at least one other output endpoint rendered at the hardware entity so as to adversely affect perception of at least one user that satisfies the user criteria. Similarly, the identification of an appropriate endpoint interface entity (act 2011) might also include determining that 1) an input endpoint for inputting at the hardware entity of the identified endpoint interface entity is capable of receiving input from at least one (a plurality of) active endpoint interface entities, or has some specific characteristic helpful or required to complete a portion of a user's task intent or delivery the appropriate action in response to some implicit event in the environment; and 2) an input endpoint for inputting at the hardware entity of the identified endpoint interface entity does not conflict with at least one other input endpoint rendered at the hardware entity so as to adversely affect ability to input of at least one user that interfaces with another endpoint interface entity. Through these determinations with respect to all input and output endpoints of the application, an appropriate distribution of interfacing may be determined.

Figure 21:
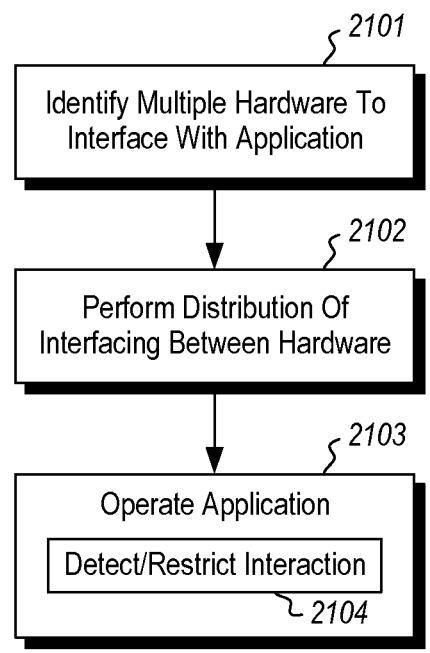
FIG. 21 illustrates a flowchart of a method for distributed interfacing with an application across a plurality of hardware entities.

FIG. 21 illustrates a flowchart of a method 2100 for distributed interfacing with an application across a plurality of hardware entities. The method 2100 is an example of the act 2012 of FIG. 20 in the context of there being multiple endpoint interface entities that interface with a particular application. The method includes identifying that multiple hardware entities are available to interface with an application having multiple endpoints (act 2101). The method 2100 then includes performing of distribution of assignments (act 2102) of the hardware entities to interact with the endpoints. This assignment includes assigning which application endpoints each hardware entity may interface with. This assignment may be rules-based.

When the application is thereafter operated (act 2103), various interaction is performed at the endpoints. The presentation module 1138 tailors the interaction (act 2104) of the hardware entities with the endpoints by, for each endpoint, restricting the interaction capability of the endpoint perhaps according to the input and output hardware capabilities of the hardware entities. For instance, if an object is to be displayed on a large display that has no touch input, a prompt to "touch here" to perform some function may be removed, whereas if the object is being displayed on a touch screen, that prompt may be present. If information is being displayed via a particular output endpoint on a high fidelity display, perhaps more detail may be displayed on the high fidelity display as compared to, for instance, a watch having a smaller display. Thus, the interaction capability of an endpoint may be restricted. In other words, the input to an endpoint may be restricted according to capabilities of the hardware entity, and output from an endpoint may be restricted according to capabilities of the hardware entity.

Furthermore, restrictions may be made depending on detection of environmental event(s) associated with a hardware entity. For instance, if most users are further away from the display, less detail might be displayed in favor of enlargement of visualizations. The rules for determining how to restrict an endpoint may be based on at least in part on 1) the interaction capabilities of the hardware entities, 2) anticipated interference in the capabilities of the hardware entities 3) a position of one or more users with respect to at least one or more of the hardware entities; and 4) a control of one or more users with respect to one or more of the hardware entities.

One benefit of the split application configuration described with respect to FIG. 18 is that data flows and interactions of the portion of the application assigned to a delegee endpoint interface entity are recorded. Thus, data flows to that portion that are synchronous in nature may be converted into asynchronous communications by recording of the same. This allows the recordings to be replayed or transferred to another hardware entity. Thus, the principles described herein allow smooth transitioning of communications from synchronous to asynchronous.

Figure 22:
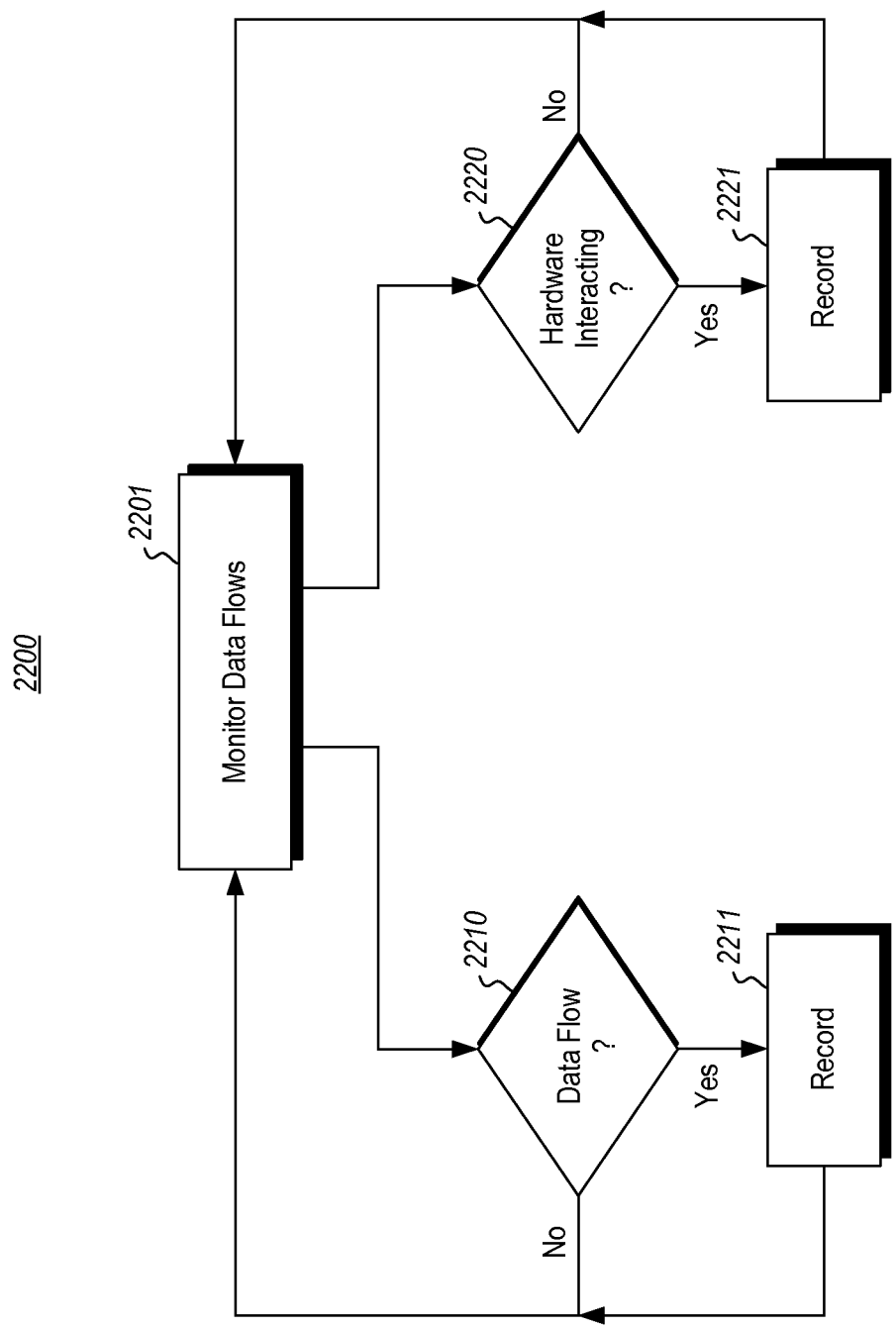
FIG. 22 illustrates a flowchart of a method for a first portion of an application to communicate with a second portion of an application in a manner that prepares for transitioning from synchronous to asynchronous.

FIG. 22 illustrates a flowchart of a method 2200 for a first portion of an application to communicate with a second portion of an application in a manner that prepares for such transitioning from synchronous to asynchronous. In the described context, the applications may be transformation chains. Throughout the method, data flow is monitored between the portions of the application (act 2201). This monitoring may also include monitoring of data flows amongst nodes within the second portion, and/or interaction of the second endpoint interface entity with endpoint nodes of the second application portion. For instance, in the context of FIG. 18, the recording module 1812 may perform the monitoring in the context of the first portion of the application being the portion 1801A, and the second portion of the application being the portion 1801B.

If, during this monitoring (act 2201), data flow is detected ("Yes" in decision block 2210), the data flow is recorded (act 2211), and the method returns to continue monitoring (act 2201). If, during this monitoring (act 2201), interactions between the second hardware entity and the second portion of the application are detected ("Yes" in decision block 2220), the interactions are recorded (act 2221), and the method returns to continue monitoring (act 2201). At times when there are no data flows detected ("No" in decision block 2210) and no interactions detected ("No" in decision block 2220), the monitoring simply continues as long as the application is split.

Figure 23:
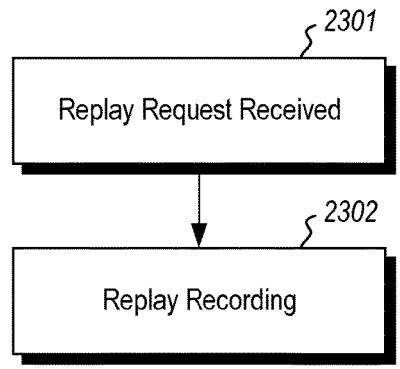
FIG. 23 illustrates a flowchart of a method for transitioning to asynchronous communications in the context of synchronous communications being recorded.

The recordings are made in a manner that they can be replayed (e.g., by the second hardware entity that is assigned to the second portion of the application) or reassigned (e.g., from the second hardware entity to a third hardware entity). FIG. 23 illustrates a flowchart of a method 2300 for transitioning to asynchronous communications in the context of synchronous communications being recorded. First, a request is received (or appropriate environment event(s) are detected suggesting that it would be helpful) to replay the recorded communications (act 2301), after which the requested replay is performed (act 2302). For instance, if the second endpoint interface entity was not readily prepared for the synchronous communication from the first endpoint interface entity, the second endpoint interface entity may simply replay the communications to come up to speed.

Figure 24:
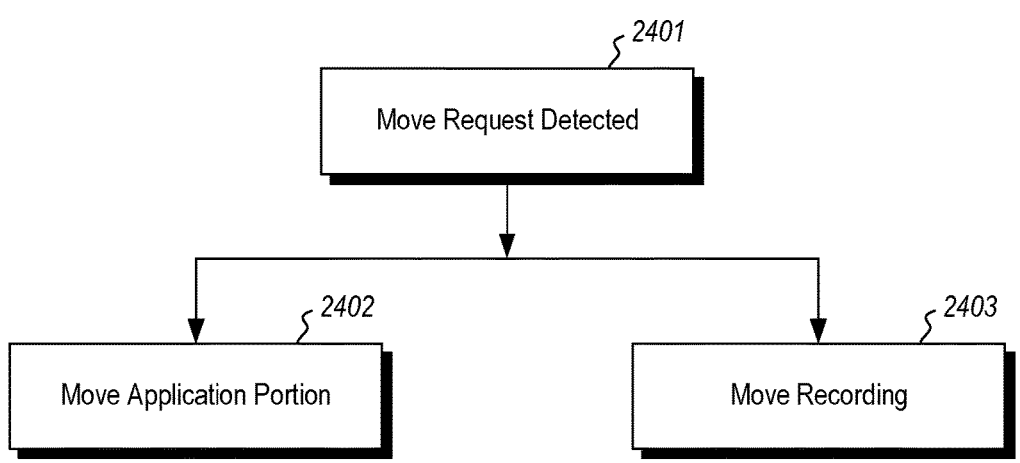
FIG. 24 illustrates a flowchart of a method for reassigning the split portion of an application to another endpoint interface entity.
Figure 25:
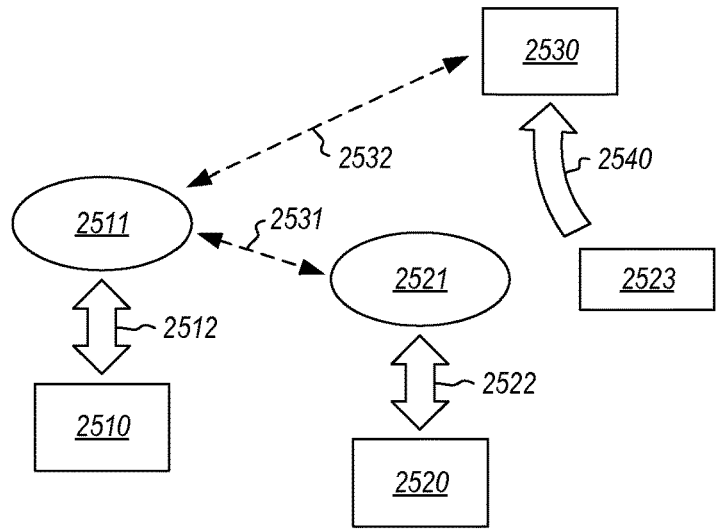
FIG. 25 illustrates an environment in which the reassignment of FIG. 24 may be made.

In another scenario, the first endpoint interface entity may reassign the split portion of the application from the second endpoint interface entity to a third endpoint interface entity, without the first endpoint interface entity having to redo the communication, and being able to take advantage of what input the second endpoint interface entity was able to provide. FIG. 24 illustrates a flowchart of a method 2400 for reassigning the split portion of an application to another endpoint interface entity. Specifically, a request is detected (or appropriate environment event(s) are detected suggesting that it would be helpful) to move the split portion of the application (act 2401). For instance, FIG. 25 illustrates an environment 2500 in which such a move request may be made. The first portion 2511 of an application had been communicating (as represented by arrow 2531) with a second portion 2521 of the application. A first hardware entity 2510 is interacting (as represented by arrow 2512) with endpoints of the first portion 2511 of the application. A second hardware entity 2520 at least has the capability of interacting (as represented by arrow 2522) with endpoints of the second portion 2521 of the application. During these communications, the recorded information 2523 (i.e., the recorded data flow represented by arrow 2531, and the recorded interactions represented by arrow 2522) is also maintained.

In response to the move request (act 2401), a third endpoint interface entity 2530 is permitted to interact with the second portion 2521 of the application (act 2402), and the recorded information 2523 is provided to the third endpoint interface entity 2530 (act 2403). This transfer of control and recorded information regarding the second portion of the application from the second endpoint interface entity to the third endpoint interface entity is represented by arrow 2540 in FIG. 25. Thereafter, the first portion of the application may communicate (as represented by arrow 2532) with the second portion of the application that has now been reassigned to the third endpoint interface entity 2530.

Formatting of displayed information becomes challenging in this environment due to the many degrees of freedom that could affect how information is formatted and laid out. For instance, the application itself may grow and be split, as previously described, and thus the application itself may change dynamically over even a short period of time. This affects the number and nature of the output endpoints that result in visualizations. Furthermore, there may be multiple hardware entities rendering visualizations of an application, each with varying capability to display. In addition, changing environmental conditions may change the availability of a hardware entity to render information. For instance, due to enforcement of user criteria, changing conditions may cause endpoint interface entities to dynamically become available and unavailable.

Figure 26:
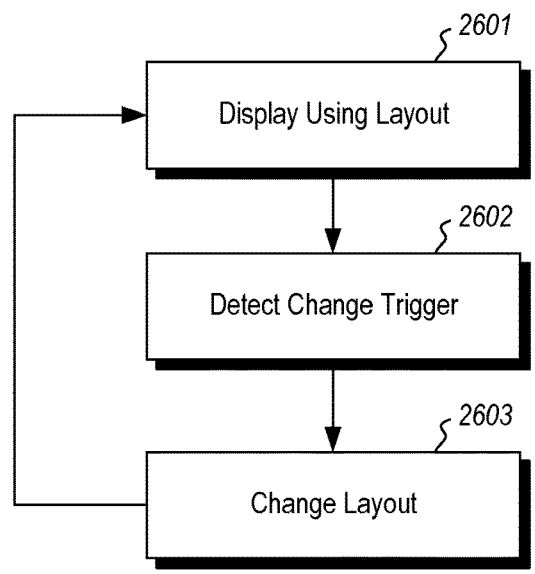
FIG. 26 illustrates a flowchart of a method for facilitating a layout on a display that receives output from an application that redefines during use.

FIG. 26 illustrates a flowchart of a method 2600 for facilitating layout on a display that receives output from an application that redefines during use. The method 2600 may be performed with respect to each available display that renders information from output endpoints of the application. First, a layout of information is presented (act 2601). Then, however, due to any one of the degrees of freedom previously mentioned, a trigger is detected (act 2602) for changing the layout. In response, the layout for that display is altered (act 2603), and the altered layout is presented (act 2601). The process is repeated with each detected trigger, thereby changing the layout. The changed layout of information may represent a change in the information that is presented. For instance, perhaps more or less detail is displayed, or perhaps subject matter not previously displayed is brought into the display, or subject matter is moved away from the display. Computations may also be performed on the visualizations. For instance, information might be merged in a display.

Examples of triggers that might change the layout include, but are not limited to, 1) the first application changes to a second application due to growth or splitting of the application, 2) a change in allocation of output between multiple displays, 3) a change in users of the display, 4) a change in position of one or more users with respect to the display, 5) a change in control of one or more users with respect to the display, 6) a change in authorization of one or more users with respect to the display or the information displayed.

Rather than simply applying to layout, the method 2600 of FIG. 26 could be applied to all forms of output and all forms of input. For instance, as for output, some parts of the output may be spoken. Some endpoint interface entities may light up or vibrate, or more to convey information (e.g., a screen swivels just a tad to suggest urgency, or an accompanying drone maneuvers in a certain noticeable way). Different parts of the output may be sequenced, rather than juxtaposed, perhaps by creating an animation on the same or multiple endpoint interface entities. For input, as an example, a particular input menu may be lit up on one display, rather than another. One microphone may be switched on, rather than another (with a light on the microphone indicating which microphone is active). Of course, these are just examples.

Accordingly, a robust and organic application model has been described on the basis of transformation chains. The concept of transformation chains was first described with respect to FIGS. 3 through 10. An example supporting architecture was then described with respect to FIG. 11. Thereafter, various operations of the transformation chains (including joining, splitting, delegation, endpoint restriction, formatting, and so forth) were described with respect to FIGS. 12 through 26. Of course, all of these functions are supported by computing technology. Accordingly, a general computing system will now be described for the sake of completeness with respect to FIG. 27.

Computing System Description

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 27:
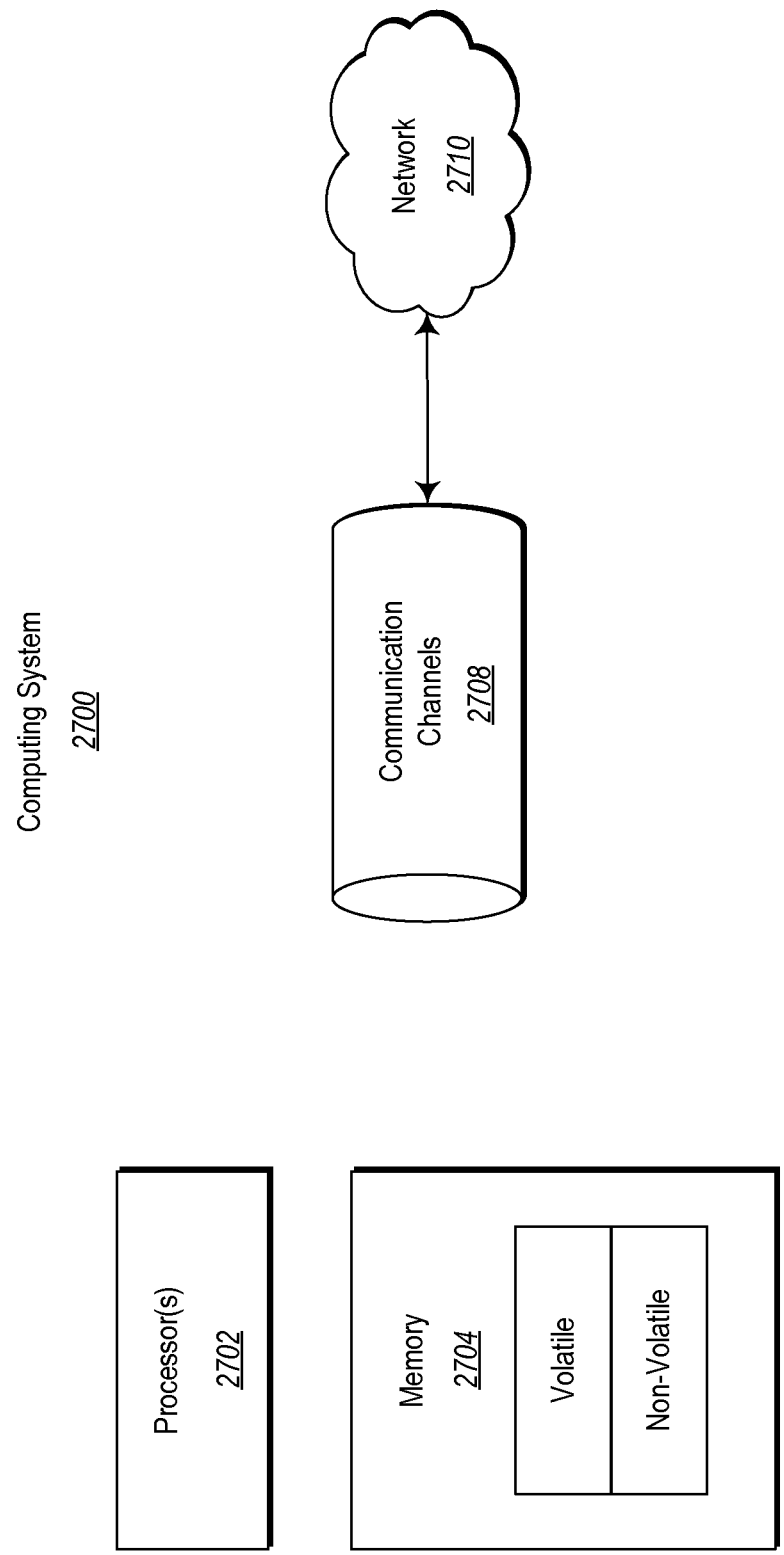
FIG. 27 symbolically illustrates a computing system in which some embodiments described herein may be employed.

As illustrated in FIG. 27, in its most basic configuration, a computing system 2700 typically includes at least one hardware processing unit 2702 and memory 2704. The memory 2704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 2704 of the computing system 2700. Computing system 2700 may also contain communication channels 2708 that allow the computing system 2700 to communicate with other message processors over, for example, network 2710.

The computing system 2700 also may potentially include output rendering components, such as displays, speakers, lights, actuators, or the like. The computing system 2700 may also include input components, such as a keyboard, pointer device (such as a mouse or tracking pad), voice recognition devices, and possibly also physical sensors (e.g., thermometers, global positioning systems, light detectors, compasses, accelerometers, and so forth).

Embodiments described herein may comprise or utilize a special purpose or general purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Accordingly, the principles described herein provide a new application paradigm in which compound and customized applications may be built dynamically as the need arises by the users themselves based on input from the user or other detected environmental event(s).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for operating an application in response to spatial status of a plurality of objects within a physical environment in which the application operates, the method comprising:

monitoring a plurality of nodes within a universal canvas, each of the plurality of nodes comprising independently executable code configured to at least receive input from or provide output to a plurality of environmental objects operating within an environment;

automatically detecting an initial spatial status of each of at least some of the plurality of environmental objects operating within the environment;

as a result of detecting the initial spatial status, combining at least some of the plurality of nodes within the universal canvas to generate an application comprising one or more transformation chain classes, wherein the application is configured to interact with the plurality of environmental objects operating within the environment according to the one or more transformation chain classes;

detecting that the initial spatial status of at least some of the plurality of environmental objects has changed;

as a result of detecting that the initial spatial status has changed, altering the relationship between at least some of the plurality of nodes within the application, including at least altering one of the one or more transformation chain classes by removing a node from the transformation chain class or adding a new node to the transformation chain class from the universal canvas, wherein as a result of altering the transformation chain class, the behavior of the application is modified.

2. The method in accordance with claim 1, further comprising:
the computing system evaluating relationships between the spatial statuses of different environmental objects of the plurality of environmental objects, wherein at least one of the evaluated relationships alters the behavior of the application.

3. The method in accordance with claim 2, further comprising:
the computing system altering a behavior of the application based on the at least one of the evaluated relationships.

4. The method in accordance with claim 1, the plurality of environmental objects comprising a plurality of users.

5. The method in accordance with claim 1, the plurality of environment objects comprising a plurality of input devices.

6. The method in accordance with claim 1, the plurality of environment objects comprising a plurality of output devices.

7. The method in accordance with claim 1, the detected spatial status of at least one of the plurality of environment objects comprising an orientation of the environment object.

8. The method in accordance with claim 1, the detected spatial status of at least one of the plurality of environment objects comprising a position of the environment object.

9. The method in accordance with claim 1, the detected spatial status comprising a change rate in orientation of the environmental object.

10. The method in accordance with claim 1, the detected spatial status comprising a velocity of the environmental object.

11. The method in accordance with claim 1, the behavior of the application being altered by joining the application with one or more additional application portions in the form of one or more new transformation chain classes.

12. The method in accordance with claim 1, the behavior of the application being altered by splitting the application, wherein splitting the application includes at least removing one or more nodes from the one or more transformation chains of the application such that the application no longer includes the executable code corresponding to the node.

13. The method in accordance with claim 1, the behavior of the application being altered by changing an output status of an output device within the environment.

14. The method in accordance with claim 1, the behavior of the application being altered by changing an input status of an input device within the environment.

15. A computing system comprising:
one or more processors;
one or more computer-readable storage media having thereon one or more computer-executable instructions that are structured such that, when executed by the one or more processors of the computing system, configure the computing system to perform the following in response to accessing an initial spatial status of each of at least some of a plurality of environmental objects that operate within an environment from which input is provided to, and to which output is provided from, an application comprising one or more transformation chain classes, wherein the spatial status of at least some of the plurality of environmental objects is subject to change;
an act of monitoring a plurality of nodes within a universal canvas, each of the plurality of nodes comprising independently executable code configured to at least receive input from or provide output to at least some of the plurality of environmental objects operating within the environment;
as a result of accessing the initial spatial status, an act of combining at least some of the plurality of nodes within the universal canvas to generate the application comprising one or more transformation chain classes, wherein the application is configured to interact with the plurality of environmental objects operating within the environment according to the one or more transformation chain classes;
an act of evaluating relationships between the spatial statuses of different environmental objects of the plurality of environmental objects, wherein at least one of the evaluated relationships alters the behavior of the application, the altering of the behavior of the application comprising altering one of the one or more transformation chain classes of the application by removing a node from the transformation chain class or adding a new node to the transformation chain class from the universal canvas, wherein as a result of altering the transformation chain class, the behavior of the application is modified.

16. The computing system in accordance with claim 15, the computing system further configured to perform the following in response to evaluating the relationships:
an act of the computing system altering a behavior of the application based on the at least one of the evaluated relationships.

17. The computing system in accordance with claim 16, the behavior of the application being altered by joining the application with one or more additional application portions.

18. The computing system in accordance with claim 16, the behavior of the application being altered by splitting the application.

19. A method for a computing system to operate an application, the method comprising:
monitoring a plurality of nodes within a universal canvas, each of the plurality of nodes comprising independently executable code configured to at least receive input from or provide output to a plurality of environmental objects operating within an environment;
automatically detecting an initial spatial status for each of at least some of a plurality of environmental objects that operate within an environment from which input is provided to, and to which output is provided from, an application comprising one or more transformation chain classes, wherein the initial spatial status of at least some of the plurality of environmental objects is subject to change;
as a result of detecting the initial spatial status, combining at least some of the plurality of nodes within the universal canvas to generate the application comprising the one or more transformation chain classes, wherein the application is configured to interact with the plurality of environmental objects operating within the environment according to the one or more transformation chain classes;
detecting that the initial spatial status of at least some of the plurality of environmental objects has changed;
as a result of detecting that the initial spatial status of at least some of the plurality of environmental objects has changed, altering one or more relationships between the initial spatial statuses of at least some of the plurality of environmental objects of, including at least altering at least one of the one or more transformation chain classes of the application by removing a node from the transformation chain class or adding a new node to the transformation chain class from the universal canvas, wherein as a result of altering the at least one transformation chain class, the behavior of the application is modified.

20. The method in accordance with claim 19, further comprising:
the computing system altering a behavior of the application based on the at least one of the evaluated relationships.

* * * * *